United States Patent [19]

Moroto et al.

[11] Patent Number: 4,954,959
[45] Date of Patent: Sep. 4, 1990

[54] NAVIGATION SYSTEM

[75] Inventors: Shuzo Moroto; Masao Kawai; Shoji Yokoyama; Koji Kobayashi; Koji Sumiya, all of Anjo, Japan

[73] Assignees: Aisin A W Co. Ltd., Anjo; Kabushiki Kaisha Shinsangyokaihatsu, Toyko, both of Japan

[21] Appl. No.: 290,204

[22] Filed: Dec. 27, 1988

[30] Foreign Application Priority Data

Mar. 2, 1988 [JP] Japan ................... 63-49965

[51] Int. Cl.⁵ .............................. G06F 15/50
[52] U.S. Cl. ........................ 364/449; 364/444; 340/990; 340/995
[58] Field of Search ............ 364/443, 444, 449; 73/178 R; 340/988, 990, 995

[56] References Cited

U.S. PATENT DOCUMENTS

| 4,481,584 | 11/1984 | Holland | 364/436 |
|---|---|---|---|
| 4,570,227 | 2/1986 | Tachi et al. | 364/444 |
| 4,608,656 | 8/1986 | Tanaka et al. | 364/449 |
| 4,660,037 | 4/1987 | Nakamura | 340/988 |
| 4,672,563 | 6/1987 | Harumatsu et al. | 364/449 |
| 4,679,147 | 7/1987 | Tsujii | 364/449 |
| 4,688,176 | 8/1987 | Hirata | 364/449 |
| 4,744,033 | 5/1988 | Ogawa et al. | 364/443 |
| 4,763,270 | 8/1988 | Itoh et al. | 340/995 |
| 4,807,157 | 2/1989 | Fukushima et al. | 340/995 |
| 4,812,845 | 3/1989 | Yamada et al. | 340/995 |

FOREIGN PATENT DOCUMENTS 58-115600 7/1983 Japan .
62-142216 6/1987 Japan .

Primary Examiner—Gary Chin
Attorney, Agent, or Firm—Varndell Legal Group

[57] ABSTRACT

A first external storage device which may be a CD stores data representing standard map of a particular area and that required for guidance, and a second external storage device which may be an IC card stores individual data which cannot be complemented by said data representing the standard map and said guidance data. Since the data is stored in both CD and IC card, the number of data can be reduced. This makes the operation simpler and enables a data that meets the demand of a user to be selectively supplied to the user. In consequence, guided navigation is made possible from any starting point to a destination, and data updating can be made relatively easy.

17 Claims, 37 Drawing Sheets

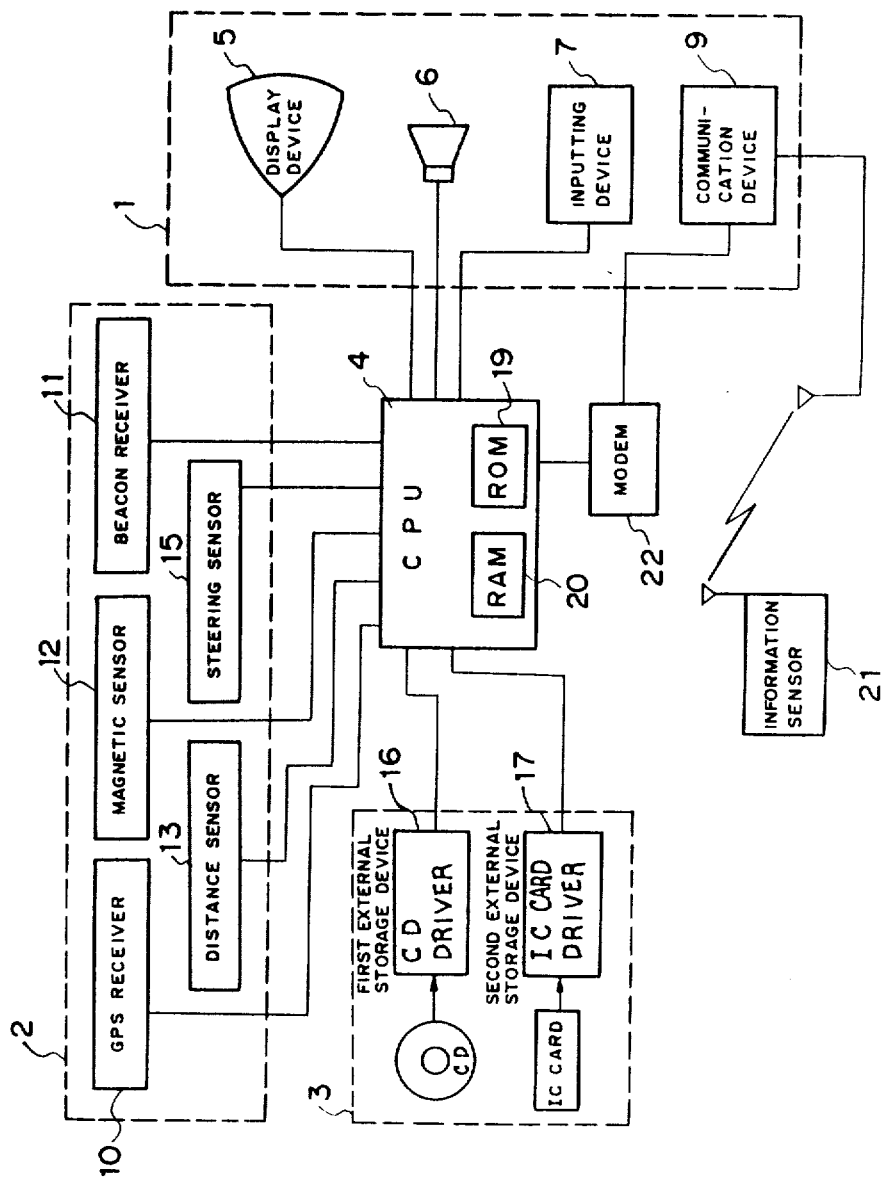

Fig.2(a)

| | |
|---|---|
| AITIKEN | ←201 |
| AITIKEN | ←202 |
| AITIKEN | ←203 |
| 0 1 | ←204 |
| 00F34 | ←205 |
| 5 3 | ←206 |
| 1 1 3 9 | ←207 |

200 { (brace encompassing 201–207)

Fig.2(b)

| | |
|---|---|
| ANJYOSI | ←208 |
| ANJYOSI | ←209 |
| ANJYOSI | ←210 |
| 0 1 | ←211 |
| 00F33 | ←212 |
| 2 0 | ←213 |
| 1 0 2 3 | ←214 |

Fig.2(c)

| | |
|---|---|
| FUJIITYO | ←215 |
| FUJIITYO | ←216 |
| FUJIITYO | ←217 |
| 0 1 | ←218 |
| OFF5314 | ←219 |
| 4 2 3 | ←220 |
| OFF5993 | ←221 |
| 1 4 5 | ←222 |
| 1 9 3 | ←223 |

Fig.3(a)

| INTERSECTION NUMBER |
|---|
| 1 |
| 2 |
| 3 |
| 27 |
| 36 |
| 56 |

Fig.3(b)

| LANDMARK NUMBER |
|---|
| 1010 |
| 1011 |
| 1012 |
| 1536 |
| 1600 |
| 1609 |

Fig.3(c)

| NAME OF PREFECTURE (ROMAN CHARACTER) | ADDRESS OF DATA |
|---|---|
| AITIKEN | ØF84Ø |

Fig.3(d)

| NAME OF PREFECTURE | ADDRESS OF DATA |
|---|---|
| AITIKEN | ØF84Ø |

Fig.5

| INTERSECTION NUMBER | NAME OF INTERSECTION | LATITUDE | LONGITUDE | ROAD HAVING THE SMALLEST NUMBER AMONG THE ROADS WHICH START FROM THIS INTERSECTION | ROAD HAVING THE SMALLEST NUMBER AMONG THE ROADS WHICH ENDS AT THIS INTERSECTION | WITH OR WITHOUT SIGNAL |
|---|---|---|---|---|---|---|
| 1 | A A | +35.20 | +137.00 | 1 | 2 | WITH SIGNAL |
| 2 | A B | +35.20 | +137.04 | 2 | 1 | WITH SIGNAL |
| 3 | A C | +35.20 | +137.09 | 4 | 3 | WITH SIGNAL |
| 4 | A D | +35.20 | +137.14 | 6 | 8 | WITHOUT SIGNAL |
| 5 | B A | +35.17 | +137.00 | 7 | 8 | WITH SIGNAL |
| 6 | B B | +35.17 | +137.04 | 12 | 9 | WITH SIGNAL |
| 7 | B C | +35.17 | +137.09 | 10 | 13 | WITH SIGNAL |
| 8 | B D | +35.17 | +137.14 | 16 | 15 | WITHOUT SIGNAL |
| 9 | C A | +35.10 | +137.00 | 17 | 18 | WITH SIGNAL |
| 10 | C B | +35.10 | +137.04 | 21 | 19 | WITH SIGNAL |
| 11 | C C | +35.10 | +137.03 | 23 | 22 | WITH SIGNAL |
| 12 | C D | +35.10 | +137.14 | 25 | 24 | WITH SIGNAL |
| 13 | D A | +35.03 | +137.00 | 26 | 27 | WITH SIGNAL |
| 14 | D B | +35.03 | +137.04 | 28 | 31 | WITHOUT SIGNAL |
| 15 | D C | +35.03 | +137.09 | 31 | 29 | WITHOUT SIGNAL |
| 16 | D D | +35.03 | +137.14 | 32 | 37 | WITHOUT SIGNAL |
| 17 | E A | +35.00 | +137.00 | 33 | 34 | WITH SIGNAL |
| 18 | E B | +35.00 | +137.04 | 35 | 33 | WITH SIGNAL |
| 19 | E O | +35.00 | +137.09 | 41 | 36 | WITH SIGNAL |
| 20 | E D | +35.00 | +137.14 | 37 | 42 | WITH SIGNAL |
| 21 | F A | +35.05 | +137.12 | 45 | 44 | WITHOUT SIGNAL |

Fig.6

| LANDMARK NUMBER | NAME OF LANDMARK | LATITUDE | LONGITUDE | CLOSEST INTERSECTION NUMBER 1 | CLOSEST INTERSECTION NUMBER 2 |
|---|---|---|---|---|---|
| 1 | A A A | +35.183 | +137.077 | 6 | 7 |
| 2 | A A B | +35.120 | +137.005 | 5 | 9 |
| 3 | A A C | +35.103 | +137.127 | 11 | 12 |
| 4 | A A D | +35.073 | +137.045 | 14 | 10 |
| 5 | A A E | +35.025 | +137.222 | 14 | 13 |
| 6 | A A F | +35.095 | +137.058 | 11 | 10 |

Fig.7

| ROAD NUMBER | STARTING POINT | ENDING POINT | ONE OF THE ROADS WHICH START FROM THE SAME STARTING POINT | ONE OF THE ROADS WHICH END AT THE SAME ENDING POINT | WIDTH OF ROAD | NO RIGHT-TURN | NO LEFT-TURN | NOT GUIDED | PHOTO NUMBER |
|---|---|---|---|---|---|---|---|---|---|
| 1 | 1 | 2 | 8 | 4 | 1 | 0 | 0 | 3 | 1 |
| 2 | 2 | 1 | 3 | 7 | 1 | 0 | 0 | 0 | 2 |
| 17 | 9 | 5 | 20 | 8 | 2 | 0 | 0 | 7 | 17 |
| 18 | 5 | 9 | 7 | 21 | 2 | 0 | 0 | 27 | 18 |
| 19 | 6 | 10 | 12 | 20 | 0 | 0 | 0 | 0 | 19 |
| 20 | 9 | 10 | 27 | 23 | 2 | 28 | 19 | 22 | 20 |
| 21 | 10 | 9 | 22 | 26 | 2 | 0 | 0 | 0 | 21 |
| 22 | 10 | 11 | 21 | 25 | 2 | 0 | 0 | 24 | 22 |
| 23 | 11 | 10 | 24 | 28 | 2 | 19 | 28 | 21 | 23 |
| 24 | 11 | 12 | 29 | 45 | 2 | 45 | 0 | 0 | 24 |
| 25 | 12 | 11 | 0 | 22 | 2 | 0 | 0 | 23 | 25 |
| 26 | 13 | 9 | 34 | 18 | 2 | 0 | 0 | 17 | 26 |
| 27 | 9 | 13 | 17 | 30 | 2 | 0 | 30 | 34 | 27 |
| 28 | 14 | 10 | 30 | 19 | 0 | 0 | 0 | 0 | 28 |
| 29 | 11 | 15 | 23 | 32 | 0 | 0 | 32 | 36 | 29 |
| 30 | 14 | 13 | 26 | 33 | 0 | 0 | 0 | 0 | 30 |
| 42 | 19 | 20 | 41 | 0 | 1 | 0 | 0 | 0 | 42 |
| 43 | 20 | 19 | 37 | 36 | 1 | 36 | 0 | 41 | 43 |
| 44 | 15 | 21 | 31 | 0 | 0 | 0 | 0 | 45 | 44 |
| 45 | 21 | 12 | 46 | 24 | 0 | 0 | 0 | 0 | 45 |
| 46 | 21 | 16 | 45 | 37 | 0 | 0 | 0 | 0 | 46 |

Fig. 9

| INTERSECTION NUMBER | NAME OF INTERSECTION | LATITUDE | LONGITUDE | ROAD HAVING THE SMALLEST NUMBER AMONG THE ROADS WHICH START FROM THIS INTERSECTION | ROAD HAVING THE SMALLEST NUMBER AMONG THE ROADS WHICH END AT THIS INTERSECTION | WITH OR WITHOUT SIGNAL |
|---|---|---|---|---|---|---|
| 1-1 | X A | +35.135 | +137.09 | 1-1 | 1-2 | WITH SIGNAL |
| 1-2 | X B | +35.10 | +137.085 | 1-9 | 1-8 | WITH SIGNAL |
| 1-3 | X C | +35.085 | +137.09 | 1-10 | 1-11 | WITHOUT SIGNAL |
| 11 | C C | +35.03 | +137.09 | 24 | 25 | WITH SIGNAL |
| 15 | D C | +35.03 | +137.09 | 31 | 32 | WITHOUT SIGNAL |

Fig. 10

| LANDMARK NUMBER | NAME OF LANDMARK | LATITUDE | LONGITUDE | CLOSEST INTERSECTION NUMBER 1 | CLOSEST INTERSECTION NUMBER 2 |
|---|---|---|---|---|---|
| 1-1 | X X A | +35.122 | +137.082 | 1-2 | 1-1 |
| 1-2 | X X B | +35.078 | +137.083 | 1-3 | 1-2 |
| 8 | A A F | +35.095 | +137.058 | 1-2 | 10 |
| | | | | | |
| | | | | | |
| | | | | | |

Fig.11

| ROAD NUMBER | STARTING POINT | ENDING POINT | ONE OF THE ROADS WHICH START FROM THE SAME STARTING POINT | ONE OF THE ROADS WHICH END AT THE SAME ENDING POINT | WIDTH OF ROAD | NO RIGHT-TURN | NO LEFT-TURN | NOT GUIDED | PHOTO NUMBER |
|---|---|---|---|---|---|---|---|---|---|
| 1-1 | 1-1 | 7 | 1-5 | 13 | 1 | 0 | 0 | 10 | 1-1 |
| 1-2 | 7 | 1-1 | 10 | 1-3 | 1 | 0 | 0 | 1-5 | 1-2 |
| 1-3 | 1-2 | 1-1 | 1-7 | 1-4 | 0 | 0 | 0 | 0 | 1-3 |
| 1-4 | 11 | 1-1 | 1-9 | 1-2 | 1 | 0 | 1-3 | 1-1 | 1-4 |
| 1-5 | 1-1 | 11 | 1-1 | 1-8 | 1 | 0 | 0 | 1-11 | 1-5 |
| 1-6 | 10 | 1-2 | 21 | 1-9 | 2 | 0 | 1-10 | 1-8 | 1-6 |
| 1-7 | 1-2 | 10 | 1-8 | 19 | 2 | 19 | 28 | 21 | 1-7 |
| 1-8 | 1-2 | 11 | 1-3 | 25 | 2 | 0 | 0 | 24 | 1-8 |
| 1-9 | 11 | 1-2 | 1-11 | 1-10 | 2 | 0 | 1-10 | 1-7 | 1-9 |
| 1-10 | 1-3 | 1-2 | 1-12 | 1-6 | 0 | 0 | 0 | 1-3 | 1-10 |
| 1-11 | 11 | 1-3 | 24 | 0 | 0 | 0 | 0 | 1-12 | 1-11 |
| 1-12 | 1-3 | 15 | 1-10 | 32 | 0 | 0 | 32 | 36 | 1-12 |
| 15 | 7 | 8 | 1-2 | 0 | 1 | 0 | 0 | 0 | 15 |
| 16 | 8 | 7 | 0 | 1-1 | 1 | 0 | 0 | 14 | 1-12 |
| 20 | 9 | 10 | 27 | 28 | 2 | 28 | 19 | 1-6 | 20 |
| 21 | 10 | 9 | 1-6 | 26 | 2 | 0 | 0 | 0 | 21 |
| 24 | 11 | 12 | 1-4 | 0 | 2 | 0 | 0 | 0 | 24 |
| 25 | 12 | 11 | 0 | 1-5 | 2 | 0 | 0 | 1-9 | 1-14 |
| 28 | 14 | 10 | 30 | 1-7 | 0 | 0 | 0 | 0 | 28 |
| 32 | 16 | 15 | 0 | 1-12 | 0 | 1-12 | 0 | 31 | 32 |
| 36 | 15 | 19 | 31 | 40 | 0 | 0 | 0 | 0 | 36 |
| 37 | 20 | 16 | 43 | 0 | 0 | 0 | 0 | 0 | 1-15 |

Fig.12(a)

| | |
|---|---|
| F U J I I T Y O | ← 215 |
| F U J I I T Y O | ← 216 |
| F U J I I T Y O | ← 217 |
| 0 1 - 0 1 - 0 1 | ← 224 |
| 0 1 0 0 0 0 | ← 219 |
| 1 2 | ← 225 |
| 0 1 C 0 0 0 | ← 221 |
| 4 | ← 222 |
| 1 9 3 | ← 223 |

Fig.12(b)

| INTERSECTION NUMBER |
|---|
| 1 - 1 |
| 1 - 2 |
| 1 |
| 2 |
| 3 |
| 4 |
| ⋮ |
| 1 - 3 |
| 1 1 |
| 1 2 |
| 1 3 |
| 1 4 |
| 1 5 |

Fig.12(c)

| LANDMARK NUMBER |
|---|
| 1 - 1 |
| 1 |
| 2 |
| 6 |
| 1 - 2 |
| 5 |

Fig.13(a)

| ROAD NUMBER |
|---|
| 2 2 |
| 2 3 |
| 2 9 |
| 4 4 |
| 4 5 |
| 4 6 |
| 4 7 |

Fig.13(b)

| INTERSECTION NUMBER |
|---|
| 2 1 |

Fig.13(c)

| LANDMARK NUMBER |
|---|
| 4 |

Fig.13(d)

| NAME OF DATA | ADDRESS |
|---|---|
| LIST OF PREFECTURES | 000000 |
| LIST OF CITIES | 000000 |
| LIST OF SUB-DISTRICTS | 000000 |
| ROAD DATA | 000100 |
| INTERSECTION DATA | 000500 |
| LANDMARK DATA | 000800 |

Fig.13(e)

| NAME OF DATA | ADDRESS |
|---|---|
| LIST OF PREFECTURES | 000000 |
| LIST OF CITIES | 000000 |
| LIST OF SUB-DISTRICTS | 000A00 |
| ROAD DATA | 010A00 |
| INTERSECTION DATA | 03A000 |
| LANDMARK DATA | 04A000 |

Fig.23(a)

| NAME OF DATA | ADDRESS |
|---|---|
| LIST OF PREFECTURES | 000000 |
| LIST OF CITIES | 000000 |
| LIST OF SUB-DISTRICTS | 000100 |
| ROAD DATA | 001000 |
| INTERSECTION DATA | 00A000 |
| LANDMARK DATA | 00F000 |

Fig.23(b)

| SUB-DISTRICT NUMBER | SEQUENCE OF DATA ON CHANGE |
|---|---|
| 01 - 01 - 01 | 1 |
| 01 - 01 - 02 | 2 |
| 01 - 01 - 03 | 0 |
| 01 - 01 - 04 | 0 |
| ⋮ | ⋮ |

Fig.23(c)

| ROAD NUMBER | SEQUENCE OF DATA ON CHANGE |
|---|---|
| 1 | 0 |
| 2 | 0 |
| 17 | 0 |
| 18 | 0 |
| 19 | 0 |
| 20 | 3 |
| 21 | 4 |
| 22 | -1 |
| 23 | -1 |
| 24 | 5 |
| 25 | 6 |
| 26 | 0 |
| 27 | 0 |
| 28 | 7 |
| 29 | -1 |
| 42 | 0 |
| 43 | -1 |
| 44 | -1 |
| 45 | -1 |
| 46 | -1 |

Fig.24(a)

| INTERSECTION NUMBER | SEQUENCE OF DATA ON CHANGE |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 1 |
| 12 | 0 |
| 13 | 0 |
| 14 | 0 |
| 15 | 2 |
| 16 | 0 |
| 17 | 0 |
| 18 | 0 |
| 19 | 0 |
| 20 | 0 |
| 21 | -1 |

Fig.24(b)

| LANDMARK NUMBER | SEQUENCE OF DATA ON CHANGE |
|---|---|
| 1 | 0 |
| 2 | 0 |
| 3 | 0 |
| 4 | -1 |
| 5 | 0 |
| 6 | 1 |

Fig.24(c)

| NAME OF DATA | ADDRESS |
|---|---|
| LIST OF SUB-DISTRICTS | 020000 |
| ROAD DATA | 021000 |
| INTERSECTION DATA | 040000 |
| LANDMARK DATA | 04C000 |

Fig.27 (a)

| THE HIGHEST LATITUDE | + 35.17 |
|---|---|
| THE LOWEST LATITUDE | + 35.03 |
| THE HIGHEST LONGITUDE | +137.14 |
| THE LOWEST LONGITUDE | +137.04 |

Fig.27 (b)

| NUMBER | LATITUDE | LONGITUDE |
|---|---|---|
| 1 | +35.03 | +137.14 |
| 2 | +35.03 | +137.04 |
| 3 | +35.17 | +137.04 |
| 4 | +35.17 | +137.14 |

Fig.27 (c)

| NUMBER | ROAD NUMBER |
|---|---|
| 1 | 32 |
| 2 | 31 |
| 3 | 28 |
| 4 | 19 |
| 5 | 14 |
| 6 | 16 |

Fig.27 (d)

| NUMBER | INTERSECTION/LANDMARK NUMBER |
|---|---|
| 1 | K - 16 |
| 2 | K - 14 |
| 3 | K - 6 |
| 4 | K - 8 |

K : INTERSECTION
T : LANDMARK

Fig. 31

| NUMBER | 150 |
|---|---|
| NAME OF DATA | ANJO |
| THE HIGHEST LATITUDE | +35.00 |
| THE LOWEST LATITUDE | +34.90 |
| THE HIGHEST LONGITUDE | +137.00 |
| THE LOWEST LONGITUDE | +136.90 |

| ADJACENT SCREENS | G1 | 141 |
| | G2 | 142 |
| | ⋮ | ⋮ |
| | G8 | 169 |

| SCREEN DATA | $a_{11}$ | $a_{12}$ | 7 | 7 |
| | $a_{13}$ | $a_{14}$ | 7 | 8 |
| | $a_{15}$ | $a_{16}$ | 8 | 8 |
| | ⋮ | ⋮ | | |
| | $a_{mn-3}$ | $a_{mn-2}$ | 1 | F |
| | $a_{mn-1}$ | $a_{mn}$ | F | F |

| NUMBER OF THE WIDE AREA VIEW WHICH CONTAIN THE AREA OF THIS DRAWING | 15 |
|---|---|

| ENLARGED VIEW OF THE PORTION IN THE AREA OF THIS DRAWING | NO. OF DRAWINGS | 5 |
| | NUMBER | 1025 ⋮ |

| G1 | G2 | G3 |
|---|---|---|
| G4 | ▨ | G5 |
| G6 | G7 | G8 |

| $a_{11}$ | $a_{12}$ | $a_{13}$ | --------- | $a_{10}$ |
|---|---|---|---|---|
| $a_{21}$ | $a_{22}$ | $a_{23}$ | --------- | $a_{20}$ |
| $a_{31}$ | $a_{32}$ | $a_{33}$ | --------- | $a_{30}$ |
| | | | | |
| $a_{m1}$ | $a_{m2}$ | $a_{m3}$ | --------- | $a_{mn}$ |

| COLOR NUMBER | COLOR |
|---|---|
| WHITE | 0 |
| BLACK | 1 |
| ⋮ | ⋮ |
| SKY BLUE | F |

Fig. 32

| NAME OF DATA | ADDRESS |
|---|---|
| GEOGRAPHY DATA | 00FF00 |

| NUMBER | 1 — 1 |
|---|---|
| NAME OF DATA | SAKURAI-CHO |
| THE HIGHEST LATITUDE | +34.97 |
| ⋮ | ⋮ |
| NUMBER OF THE WIDE AREA VIEW WHICH CONTAINS THE AREA OF THIS DRAWING | 150 |
| ENLARGED VIEW OF THE PORTION OF THE AREA OF THIS DRAWING | 0 |

| GEOGRAPHY DATA NUMBER | ORDER OF CHANGED DATA |
|---|---|
| 1024 | 0 |
| 1025 | 1 |
| 1026 | 0 |
| 1027 | 2 |
| 1028 | −1 |

| NUMBER | 1025 |
|---|---|
| NAME OF DATA | ANJO |
| ⋮ | ⋮ |
| ADJACENT SCREENS G1 | 1020 |
| ⋮ | ⋮ |
| G7 | 1 — 1 |
| G8 | 0 |
| ⋮ | ⋮ |

| NUMBER | 1027 |
|---|---|
| NAME OF DATA | OKAZAKI STATION |

| NAME OF DATA | ADDRESS |
|---|---|
| GEOGRAPHY DATA | 050000 |

Fig. 36
Fig. 37
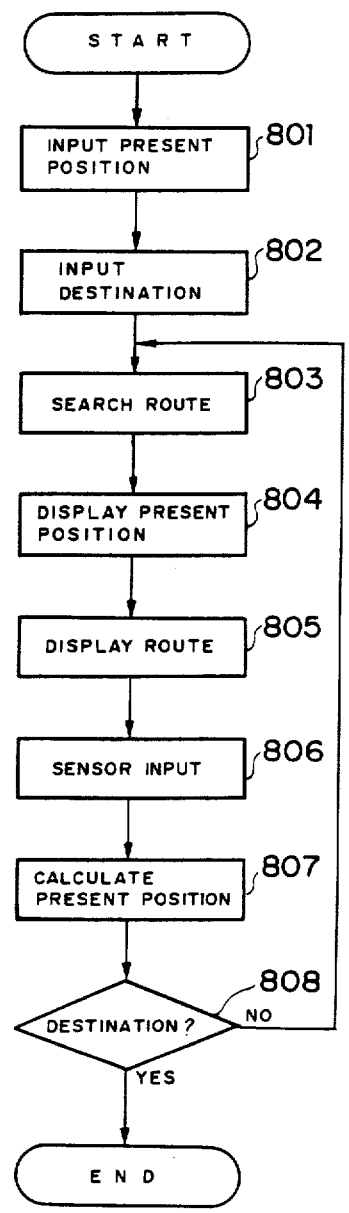
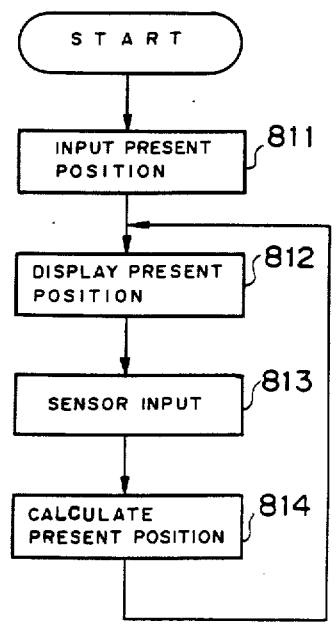

NAVIGATION SYSTEM

BACKGROUND OF THE INVENTION

1. Field of the Invention:

The present invention relates to a navigation system for outputting information required to reach a destination.

2. Description of the Related Art:

Recently, navigation systems for vehicles have been developed which are designed to output on a display various types of information required for a driver who is unfamiliar with a particular area to reach a destination and thereby guide the driver to the destination.

Conventional navigation systems fall into two types: the location method and fixed route method.

The location method was proposed in, for example, the specification of Japanese Patent Laid-Open No. 58-115600. In this method, a map stored in an external memory is read out and is stored in an image memory by an arithmetic and logic unit constituted by a microcomputer. Also, the arithmetic and logic unit calculates the locus of a vehicle using data input from azimuth and distance sensors, and displays the map and the locus of the vehicle on a display.

Japanese Patent Laid-Open No. 62-142216 discloses the fixed route type navigation system. In this method, a course that is to be followed from a starting point to a destination is set beforehand, and the driver is guided in accordance with the course set. The next intersection along the course where the vehicle is to turn is indicated in this method by numerically or graphically displaying the distance remaining before that intersection is reached. So, the driver looks at the course indicated on the map and knows the intersection where he should turn. Alternatively, the driver looks at the numerals or graph displayed to ascertain the distance remaining to that intersection, and thus knows the intersection where the vehicle should be turned.

In both the location method and the fixed route method, the information required to guide a vehicle to a destination such as map data or intersection data is stored in one external memory such as a floppy disk, a CD-ROM, or a magnetic tape. Guided navigation to a plurality of areas (e.g., to Nagoya and Kyoto) is made possible by using corresponding external memories which are switched with each other as required.

In both of the above-described conventional navigation systems in which the information required to guide a vehicle to one area, e.g., Kyoto, such as map data or intersection data, is stored in the external memory beforehand, not all the information is stored in the external memory. Also, it is very difficult to store all the information in the external memory, both in terms of storage capacity and the calculation ability of the central processing unit. Even if all the necessary information is input in the memory, a large amount of information makes selection of a destination very difficult. In both of these navigation systems, it is impossible to guide a vehicle if the memory does not contain the information on a desired starting point or destination beforehand. In that case, a driver has to go to a nearby starting point which is stored in the memory without the assistance of the navigation system. He also has to go to his true destination by himself after he has reached the destination input in the memory beforehand.

Further, modification, addition and deletion of the information stored in an external memory such as map data or intersection data requires a great deal of time and expense.

The above-described location method has its own problem in that, in a case where it is necessary to turn at an intersection indicated on a map displayed on the display device, it may be impossible for a driver to identify an intersection where the vehicle is approaching with the one indicated on the map, due to errors accumulated in the measured running distance or direction. The driver may pass an intersection where he should turn, or the present position on the map may not correspond with a road on the map.

In the fixed route method, since the course to be followed from a starting point to a destination is set beforehand and the vehicle is guided in accordance with the course set, it is difficult to change the destination during travel. Further, if, for example, a wrong turning is made and the driver deviates from the original course, it is impossible to continue travelling under the guidance of the navigation system unless the vehicle can be returned to the course originally set. Furthermore, it is necessary to judge whether a vehicle has passed a predetermined intersection as planned on the basis of running distance data prepared by a distance sensor or data representing right or left turns which is obtained through a steering sensor. In consequence, any detection errors which occur during actual travel may cause misjudgement.

In order to obviate these problems, the present inventors filed an application in respect of a navigation system for outputting information required to guide a vehicle to a destination at a plurality of points (in Japan under Japanese patent application No. 62-307805 and in the U.S.A. on Oct. 20, 1988, as U.S. Ser. No. 07/260,213). In this system, the coordinates of a plurality of points are set and the information required to reach the destination is calculated at each of these points. This method (hereinafter referred to as the coordinate origin method) has the advantage that it is possible to change a destination during travel and that the course followed to a destination can be searched relative to any of the plural points. However, as stated above, it is difficult to input all the information required to guide a vehicle to a particular destination. It is therefore essential to decide properly which information is to be stored and how the stored information is to be used.

SUMMARY OF THE INVENTION

An object of the present invention is to provide a navigation system which can obviate the aforementioned problems, which enables a vehicle to be guided to a destination from any starting point by preparing a standard data base as an internal or external memory and an individual data base that complements this standard data base as an external memory, and which enables the data to be updated relatively easily.

To this end, the present invention provides a navigation system which comprises a display device 5, an external storage unit 3 for storing data needed for guidance, and a central processing unit 4 for processing the data in the external storage unit in accordance with a navigation program and outputting the result to the display device. The external storage unit 3 includes a first external storage device 16 which stores standard data needed for guidance and a second external storage device 17 which stores additional information of the standard guidance data. The CPU selectively operates the data stored in the first and second external storage devices.

In the present invention, the first external storage device 16, which may be a CD, stores data representing the standard map of an area and the data required for guiding a vehicle in that area, and the second external storage device 17, which may be an IC card, stores individual data which cannot be complemented by the standard map data and the guidance data. In an actual operation, the CD stores the data representing the major route map of Japan or any area in the world and the data required for guidance. The IC card stores the data on the map of the vicinity of a hotel, a gas station or a rental car office in a particular area, and the data needed to guide a vehicle in that vicinity. IC cards are prepared for various objectives. For example, IC cards which store data needed to guide a user on a sightseeing trip or that needed to guide a user to commercial premises, a station or an airport may be prepared. Th IC cards may additionally store traffic information or weather information. The hotels, gas stations and rental car offices may serve as information centers where data is input into the card and data in the card is updated, and where these cards are sold and supplied to users. Thus, a user is first led to a target area using a CD. After arriving the area, he receives an IC card at the information center, and is then guided to a target location with the assistance of that card. Alternatively, data which is prepared in an information center may be input to the RAM of the CPU or to the IC card by a communication device such as a car telephone through a telephone line. In that case, it is not necessary to prepare CD or IC cards which store data beforehand.

Thus, in the present invention, since only the detailed data which is adequate for a desired area and a desired objective can be stored in the IC card which serves as the second external storage device, the data stored in the first external storage device which is a CD can be simplified. Further, modification and addition of data is performed on that stored in the IC card, and this facilitates maintenance operation. Furthermore, since data is stored in both CD and IC card, the number of data stored can be reduced. This makes the operation simpler and enables a data that meets the demand of a user to be selectively supplied to the user. As a result, guided navigation is made possible from any starting point to a destination by preparing a standard data base and an individual data base that complements the standard data base as the external memories. Further, data updating can be made relatively easy.

BRIEF DESCRIPTION OF THE DRAWINGS

FIG. 1 (b) shows the structure of an external storage device; FIGS. 2(a), 2(b), 2(c), 3(a), 3(b), 3(c), 3(d), 4, 5, 6, and 7 show the structure of data stored in the first external storage device;

FIGS. 8, 9, 10, 11, 12(a), 12(b), 12(c), 13(a), 13(b), 13(c), 13(d) and 13(e) show the structure of data stored in the second external storage device;

FIGS. 23(a), 23(b), 23(c), 24(a) 24(b), and 24(c) show the structure of data, showing a second embodiment of the present invention;

FIGS. 27(a) to 27(d) show the structure of data, showing a third embodiment of the present invention;

FIGS. 31 and 32 show the structure of data, showing a fourth embodiment of the present invention;

FIGS. 36 and 37 are flowcharts, showing another types of navigation system to which the present invention is applied.

DETAILED DESCRIPTION OF THE PREFERRED EMBODIMENTS

Embodiments of the present invention will be described below with reference to the accompanying drawings.

Figure 1:
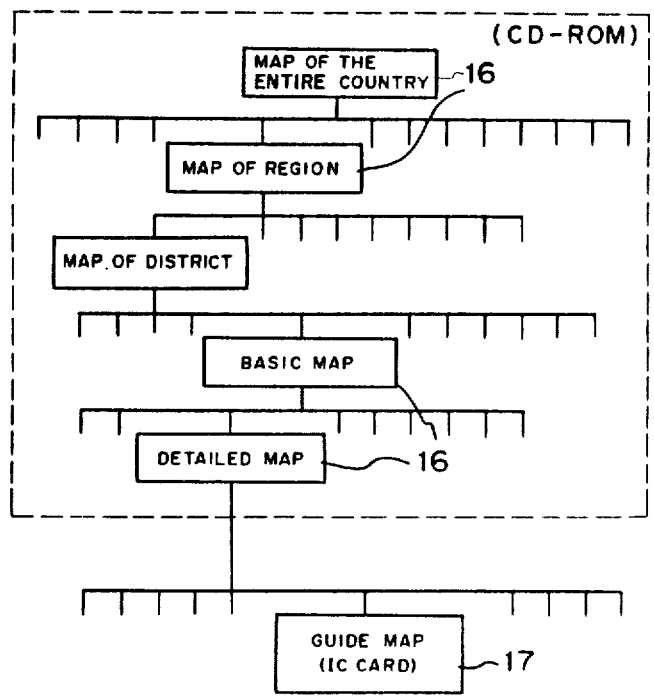
FIG. 1 (a) is a block diagram of a navigation system, showing a first embodiment of the present invention.

Referring first to FIG. 1 which is a block diagram of a first embodiment of a navigation system according to the present invention, a system comprises a man-machine interface 1, a present position checking unit 2, an external storage unit 3, and a central processing unit 4.

The man-machine interface 1 includes at least a display device 5 and an inputting device 7. The display device 5 may comprise a CRT, a liquid crystal display or the like. The inputting device 7 may comprise a keyboard, a touch-panel, a light pen, a mouse or the like. The man-machine interface 1 optically includes a speech output device 6 such as a speaker and a communication device 9 such as a car telephone.

The present position checking unit 2 employs either a receiver 10 for a global positioning system (GPS) which measures a position utilizing an artificial satellite, a beacon receiver 11 for receiving the positional information from a beacon disposed on a road, a geomagnetic sensor 12, a distance sensor 13 or a steering sensor 15. Both of the GPS receiver 10 and the beacon receiver 11 can be used as a single unit to measure the present position. However, the geomagnetic sensor 12 and the steering sensor 15 must be used together with the distance sensor 13.

The external storage unit 3 consists of a first external storage device 16 and a second external storage device 17. Floppy disks, CD-ROMs, optical disks, magnetic tapes, IC cards, or optical cards may be used as the first and second storage devices 6 and 7. However, a CD-ROM having a large storage capacity may be preferably used as the first external storage device 16, and the second external storage device 17 may be of the card type which can be manufactured at a low cost. The first external storage device 16 which may be a CD stores data on the standard map of a particular area and the data required to guide a vehicle in that area, and the second external storage device 17 which may be an IC card stores individual data which cannot be complemented by the data on the standard map and that required for guidance. More specifically, as shown in FIG. 1 (b), data on the major route map of Japan or of any area in the world, as well as the data required for guidance are input in the CD, and data on the map of the vicinity of a hotel, a gas station or a rental car office located in a certain area and data required for guidance are input in the IC card. IC cards may be prepared for various objectives, e.g., IC cards storing information required to guide a user on a sightseeing trip or that required to guide a user to commercial premises, a station or an airport may be prepared. IC cards may additionally store traffic information, weather information and the like. The hotels, gas stations and rental car offices may serve as information centers where data is input or data in the IC card is updated, and where IC cards are sold or supplied to users. Thus, a user is first led to a target area using a CD. After arriving at that area, he receives an IC card at the information center and is then led to a destination with the assistance of that IC card. It is to be noted, however, that the data representing the map and that required for guidance are structured in different ways in the location method, the fixed route method and the coordinate origin method, as will be described later.

This embodiment employs two external storage devices 16 and 17 as its external storage unit. However, the standard information required for guidance may also be stored in a storage device within the CPU 4 rather than in the first external storage device 16.

Once a user has input a destination through the inputting unit 1, the CPU 4 reads out the data representing a map and that required for guidance from the external storage unit 3, operates the data, stores the operation results in a RAM 20, and outputs the necessary results to the display device 5 or the speech output device 6 in accordance with a navigation program stored in a ROM 19. The data required to guide a user which is output from the external storage unit 3 represents the data required for the vehicle to reach the destination. To a vehicle which is located at an intersection on a specific route, data representing a right turn or a left turn that the vehicle should make at a subsequent intersection is output. In a case where there is another intersection very close to a first intersection where the vehicle turns, the data representing the direction in which the vehicle should turn at the first intersection and that representing a traffic lane in which the vehicle should travel after it has turned at the first intersection may be output as information required for guidance. Alternatively, the direction in which the vehicle should turn at the second intersection may also be output as information required for guidance.

In addition, the data which is prepared in an information center 21 may be input by the communication device 9 such as a car telephone through a telephone line, the input data being entered to the RAM of the CPU 4 or in an IC card through a modem 22. In this case, it is not necessary to store data in an IC card beforehand. A hotel, a gas station or a rental car office in an area may be able to serve as the information center 21. Alternatively, an information center which acts as a service center for the entire region or a metropolitan area may be installed.

Next, the structure of the data employed in the navigation system for the vehicle according to the present invention, as well as the control process executed in the navigation system will be described below.

First, an example in which the present invention is applied to the coordinate origin method will be described.

FIGS. 2 to 7 show the structure of the data stored in the first external storage device (e.g., in a CD) employed in the navigation system for the vehicle according to the present invention.

FIG. 2 (a) shows a list of relatively broad regions, e.g., a list of prefecture names. Prefecture number 01(200) represents Aichi Prefecture. The list contains prefecture names in Chinese character (201), Hiragana (202) and Romaji (roman character) (203), the prefecture number (204), the address of list of cities (205) (the starting address thereof), the number of cities listed (206), the major intersections/landmarks numbers (207) and so on. FIG. 2 (b) shows a list of wards or cities which is the data narrower than the region data. The list contains city names in Chinese character (208), Hiragana (209) and Romaji (210), the city number (211), the address of list of sub-districts (212) (the starting address thereof), the number of sub-districts listed (213), the major intersections/landmarks numbers (214) and so on. FIG. 2 (c) shows a list of sub-districts, which is the data narrower than the ward or city data. The list contains sub-district names in Chinese character (215), Hiragana (216) and Romaji (217), the sub-district number (218), the address of list of intersections (219) (the starting address thereof), the number of intersections listed (220), address of list of landmarks (221), the number of landmarks listed (222), the major intersections/landmarks numbers (223) and so on. Such hierarchically structured data enables the list of prefectures, the list of cities and the list of subdistricts to be searched for a starting point, a present position or a destination input in that order. Further, it enables the major intersection or landmark to be separately searched in the list of prefectures, in the list of cities and in the list of sub-districts.

FIGS. 3 (a) and (b) respectively show a list of intersections that are located in each sub-district and a list of landmarks located in each sub-district. The lists contain the intersection numbers and landmark numbers, respectively. FIGS. 3 (c) and (d) respectively show the sort files of Romaji and Hiragana characters. The files contain alphabetically arranged prefecture names and the addresses of data representing the prefectures, and this enables the time required for search of the name of a place to be shortened.

Figure 4:
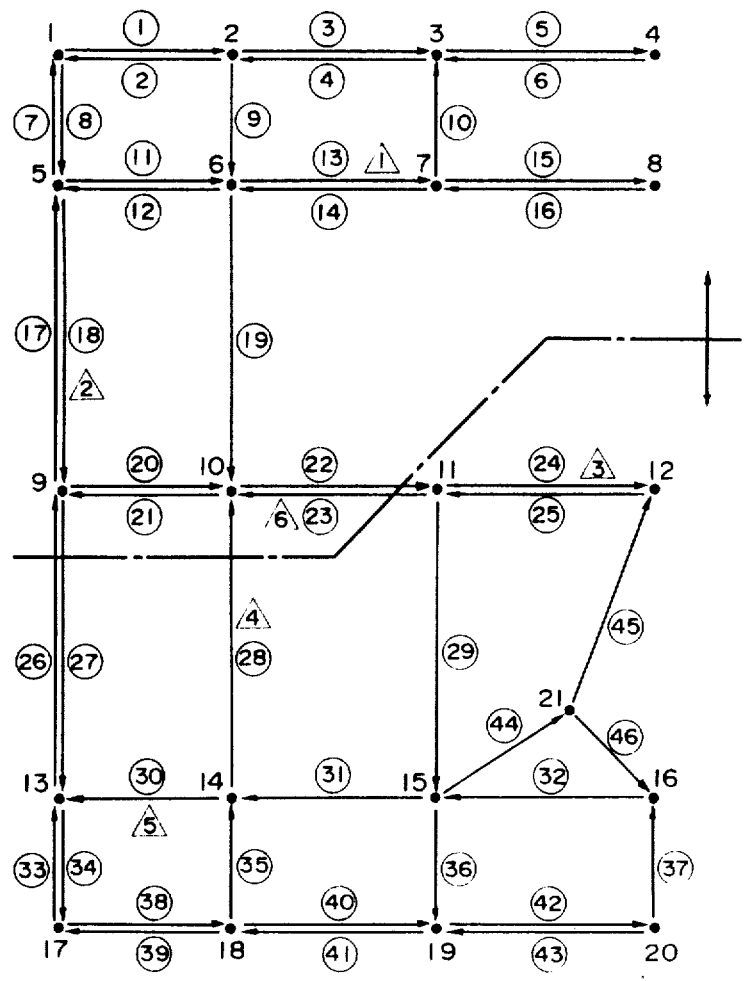

FIG. 4 shows an example of numbering of roads and intersections on a map contained in CD data. In two sub-districts, there are 21 intersections from 1 to 21, and there are 46 roads from 1 to 46. If two-way traffic is allowed on a road, two different numbers are affixed to that road. If the road is a one-way road, one number is affixed to that road.

FIG. 5 shows an example of intersection data. The data includes the name of an intersection which corresponds to a intersection number, the coordinate (the latitude and a longitude), the road number which starts from an intersection and which has the smallest number, the road number which ends at that intersection and which has the smallest number, and data representing whether or not an intersection has a signal. A route can be searched and various navigation information can be displayed on a display using this data.

FIG. 6 shows an example of landmark data. The data includes the name of a landmark which corresponds to a landmark number, (e.g., the name of a river, the name of a building or the name of a bridge), the coordinate and the intersection numbers located adjacent to a landmark.

FIG. 7 shows an example of road data. As shown in FIG. 4, each road has its own number or numbers, and the road data contains the starting point and ending point (the intersection numbers) of each road number, one of the roads which start from the same starting point, one of the roads which end at the same ending point, the width of a road, no passage data, not guided data (e.g., no data is output when a vehicle proceeds from a road number 1 to a road number 3) and the photo number of an intersection.

Next, the structure of data stored in the second external storage device (e.g., an IC card) will be described below with reference to FIGS. 8 to 13

Figure 8:
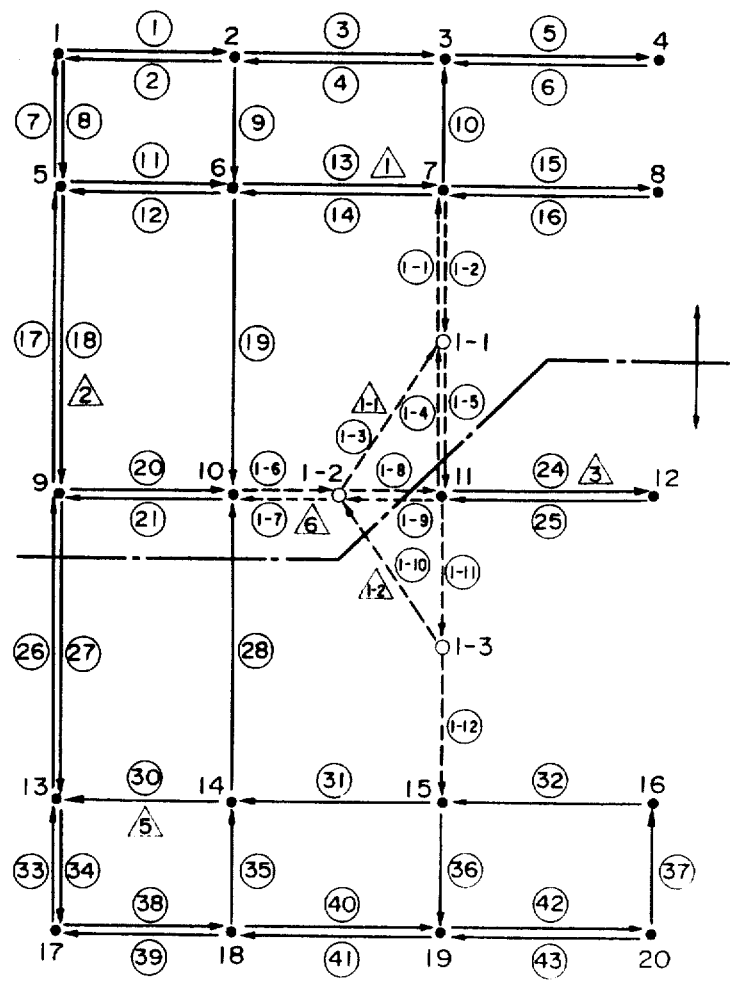

FIG. 8 shows the intersections and roads after the IC card data is added to the CD data. The roads to be added are indicated by a broken line, and added intersections and roads are affixed with sub-numbers, the road numbers being enclosed by an ellipse. As shown in FIG. 8, intersections from 1-1 through 1-3 and roads from 1-1 through 1-12 are added, and roads 22, 23, 29, 44, 45 and 46 are eliminated from the original map.

FIGS. 9, 10 and 11 respectively show intersection data, landmark data and road data to be added as the result of the addition of the intersections and roads shown in FIG. 8. The data contains the newly added data and data representing the modification of the intersection data and road data caused by the addition.

FIG. 12 (a), (b) and (c) respectively show modified data on the list of sub-districts, the list of intersections and the list of landmarks which are changed as the result of addition of intersections and roads shown in FIG. 8.

FIGS. 13 (a) to (c) respectively show road data, intersection data and landmark data to be deleted. FIG. 13 (d) shows the data representing the starting address of the deletion data in the memory, and FIG. 13 (e) shows the data representing the starting address of the modified data in the memory. The starting address 0 indicates that the data is not deleted or changed.

Control of the thus-arranged navigation system which employs the coordinate origin method will be described below with reference to FIGS. 14 to 22.

Figure 14:
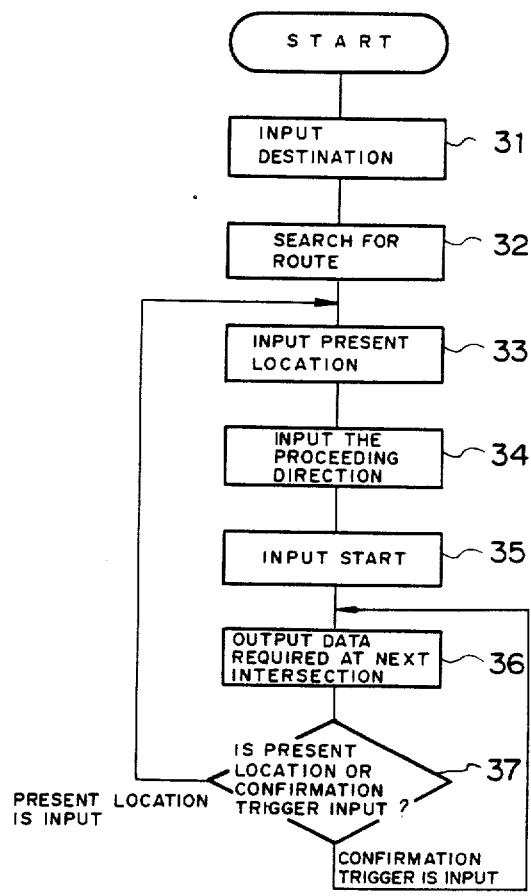
FIG. 14 is a flowchart of the control processing executed in the coordinate origin method.

Referring first to FIG. 14, a driver inputs a destination (in step 31). Once the destination has been input, the system is switched into route search mode in which data required to guide a user to the destination is set with respect to all the points other than the destination (in step 32). After the route has been searched, the system switches to present position input mode in which the present position is input (in step 33), and the direction in which the vehicle proceeds from that point is then output (in step 34). Thereafter, an intersection confirmation trigger is input (starting of a vehicle is input in step 35), and the data required for the vehicle to reach the destination at a subsequent intersection is then output (in step 36). Next, it is monitored which is input next, an intersection confirmation trigger or a present position input button signal (in step 37). If the intersection confirmation trigger is input, the processing returns to step 36. If the signal input is the present position input button signal, the flow returns to step 33. In other words, in this system, when the vehicle is running as guided, a trigger is input every time the intersection is confirmed. If the vehicle passes the intersection where it is to turn and deviates from the course, the present position input button is pressed. Thus, every time the trigger is input, data required for the vehicle to reach the destination at an intersection along the route is output. When the present position input button is input, the system switches to present position input mode.

Figure 15A:
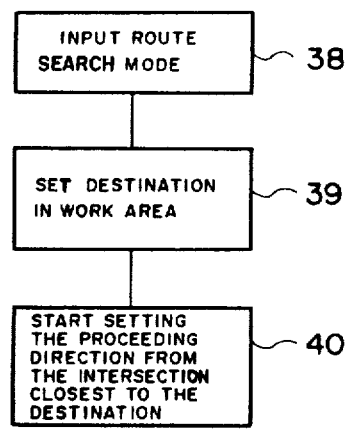
FIGS. 15 (a) and 15 (b) show a flowchart of route searching processing.
Figure 15B:
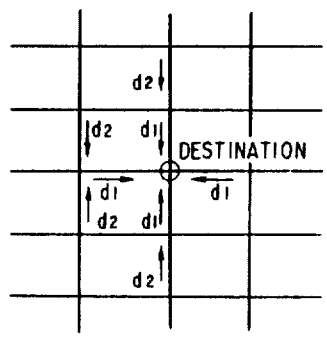

As shown in FIG. 15 (a), once the system has been switched to route search mode, a destination is set in a work area (in step 39), and the directions in which the vehicle may proceed are set starting from the intersections closest to the destination (in step 40). More specifically, the directions $d_1$ are set first with respect to the intersections closest to the destination, and the directions $d_2$ are then set with respect to the second closest intersections, as shown in FIG. 15 (b). The route search may also be performed after the step 33 shown in FIG. 14 has been executed. In that case, the route search is performed every time the present position is input. In a trigger input, since the data required for the vehicle to reach the destination is output in accordance with the route set by the route search, the number of intersections that are located on the route is limited. Therefore, the system may also be arranged such that only the data required at these intersections is set.

Figure 16:
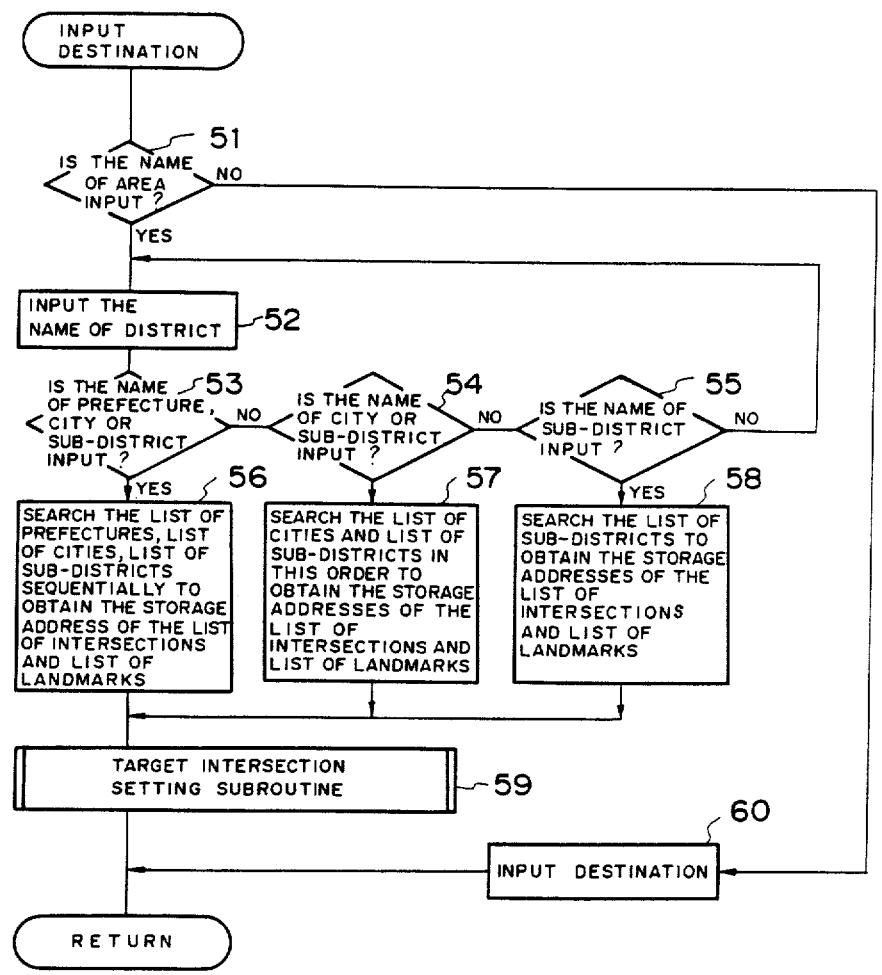
FIG. 16 is a flowchart of destination inputting process.

Once a destination has been input in step 31, it is first determined as to whether or not the name of a region is input in step 51, as shown in FIG. 16. Subsequently, the list of prefectures, the list of cities and the list of subdistricts are successively searched to fetch the addresses of the intersection list and landmark list using a combination of prefecture, city and sub-district which is input (in steps 52 to 58). If the name of a region is not input, a code number is input in step 60. Thereafter, target intersection setting route is executed in step 59. A prefecture, a city and a sub-district may be input through a touch panel or by pressing Romaji or Hiragana keys. A region is selected on the touch panel when that portion of the touch panel is touched.

Figure 17:
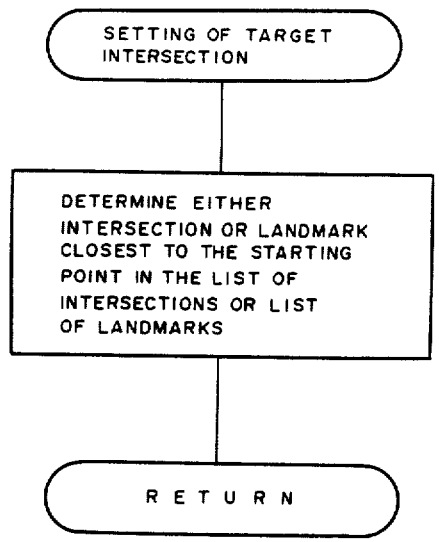
FIG. 17 is a flowchart of destination setting process.

In the target intersection setting subroutine executed in step 59 in FIG. 16, one of the intersections or landmarks which is the closest to the starting point is searched from the list of intersections and the list of landmarks (route search), as shown in FIG. 17.

FIGS. 16 and 17 are respectively flowcharts of processings generally executed when a route is searched and when the target intersection is searched. However, the data employed in this embodiment consists of CD data stored in the first external storage device 16 and IC card data stored in the second external storage device 17. The processing of these two types of data will be described now with reference to FIGS. 18 and 19.

Figure 18:
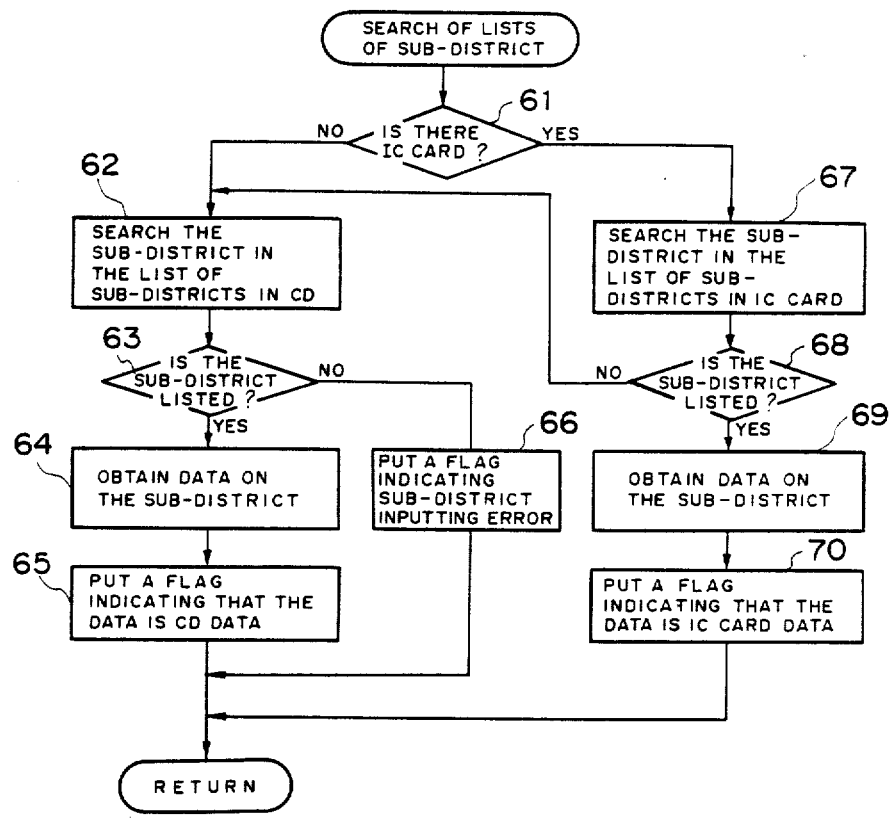
FIGS. 18 and 19 are flowcharts of a data searching process executed in the first embodiment of the present invention.

FIG. 18 is a flowchart of a sub-district search conducted on these two types of data. First, it is determined in step 61 whether or not there is an IC card. If the answer is negative, the list of sub-districts in the CD [which is shown in FIG. 2 (c)] is searched for the sub-district in step 62, the data on the sub-district is fetched, and a flag indicating that the obtained data is a CD data is set (in steps 63 to 65). If there is an IC card in step 61, the list of sub-districts in the IC card [which is shown in FIG. 12 (a)] is searched for the target sub-district, and it is then determined whether or not there is the sub-district (in steps 67 and 68). If the answer is negative, the processing goes to step 62. On the other hand, if the answer is affirmative, the data on the subdistrict is fetched, and a flag indicating that the obtained data is an IC card data is set (in steps 69 and 70).

Figure 19:
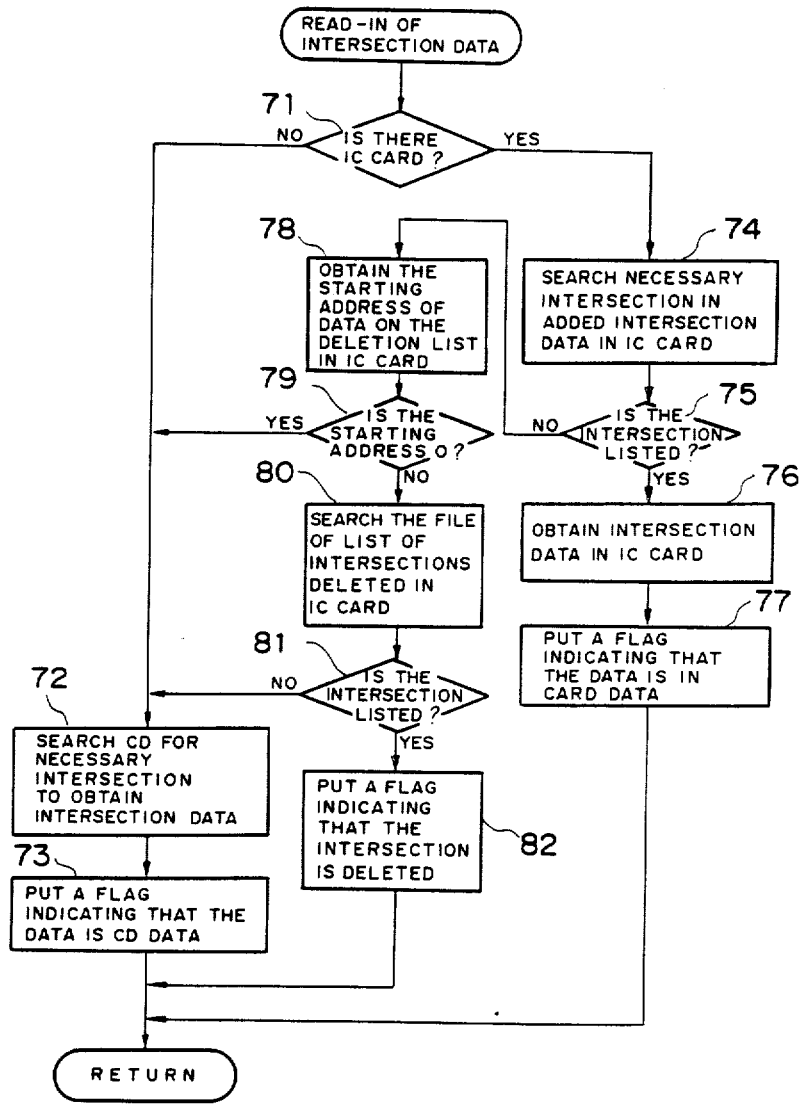

FIG. 19 is a flowchart of a read of the intersection data. First, it is determined whether or not there is an IC card in step 71. If the answer is negative, the intersection data stored in the CD (shown in FIG. 5) is searched for a necessary intersection and the target intersection data is fetched in step 72. Thereafter, a flag indicating that the obtained data is a CD data is set in step 73. If it is determined that there is an IC card in step 71, the added intersection data stored in the IC card (shown in FIG. 9) is searched for a necessary intersection in step 74. Subsequently, it is determined in step 75 whether or not the necessary intersection data is listed. If the answer is affirmative, the intersection data is fetched, and a flag indicating that the obtained data is an IC card data is then set (in steps 76 and 77). If it is determined that there is no intersection in step 75, the starting address of deletion data stored in the IC card [shown in FIG. 13 (d)] is fetched in step 78. If it is determined that the starting address is 0 (indicating that there is no deletion) in step 79, the processing proceeds to step 72. If the starting address is 0, search is conducted on the deleted intersection file stored in the IC card [shown in FIG. 13 (b)] in step 80. If the file contains the intersection, a flag indicating that the intersection is deleted is then set (in steps 81 and 82).

Search is conducted on the road data and the landmark data in the same manner as that in which the intersection data is searched. That is, search is conducted first on the data stored in the IC card first and then on the data stored in the CD.

Figure 20:
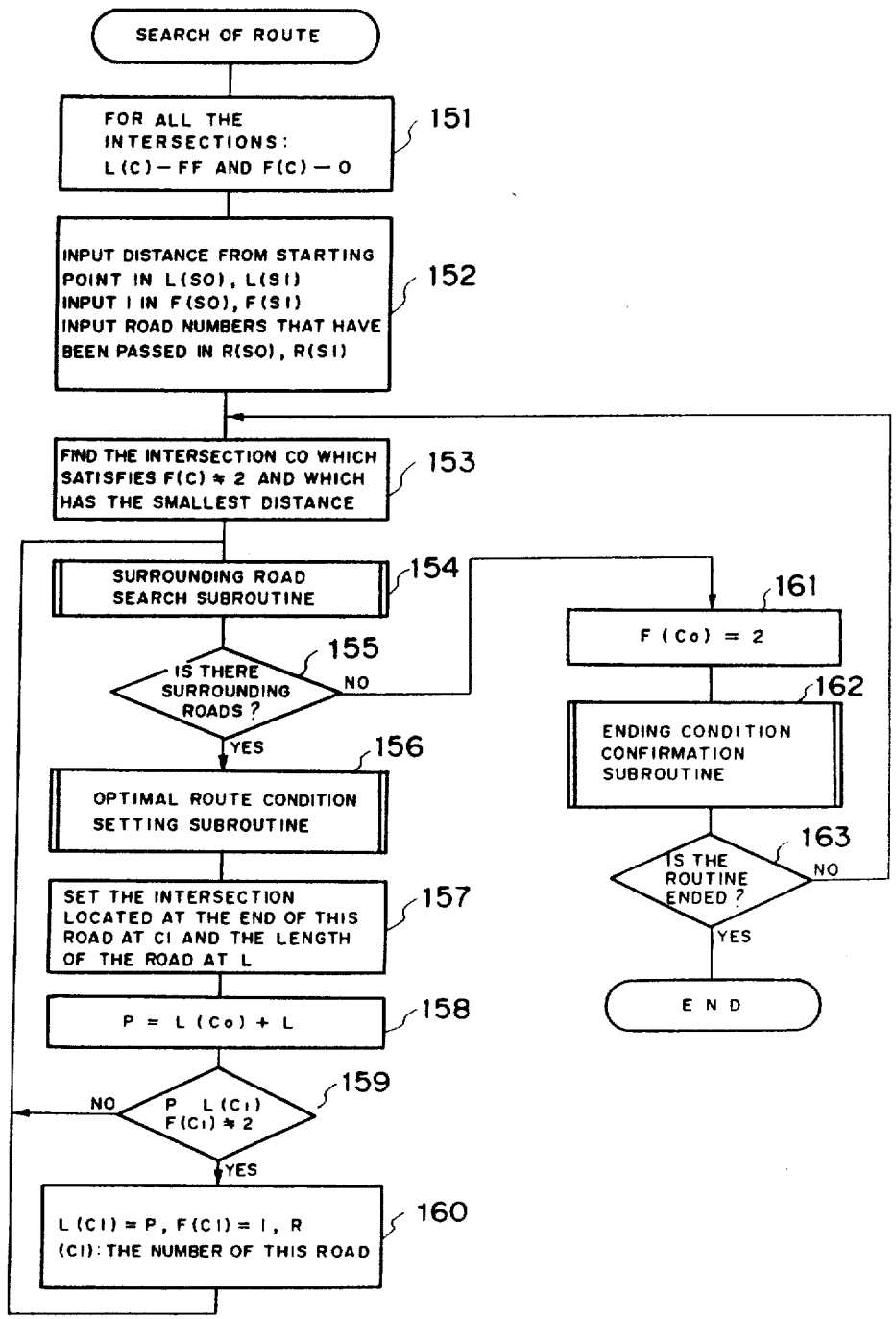
FIGS. 20, 21, and 22 are flowcharts of route searching process.

FIG. 20 is a flowchart of route searching processing which is executed on the basis of the data which is read out from the CD and IC card. In FIG. 20, the following parameters are used:

L(c): distance from the starting point;
F(c): flag;
0: not yet searched;
1: being searched;
2: searched;
R(c): road number that has been passed (c: intersection number);
S0,S1: intersections adjacent to the starting point; and
e),e1: intersections adjacent to the destination.

First, in step 151, FF is assigned to the distance L (c) from the starting point with respect to all the intersections, and the search flag F (c) is set at 0 (indicating not searched) (the distance L (c) and search flag F (c) are initialized). Next, the distance from the starting point is assigned to the distances of the intersections located adjacent to the starting point, and the flags of the intersections located adjacent to the starting point are set at a search flag 1 (indicating that the intersection is being searched) in step 152. Further, the number of the road that the vehicle has passed after it started from the starting point is set. In step 153, an intersection whose flag is not 2 (which indicates that the search is over) and which has the smallest distance is found. Subsequently, in steps 154 and 155, the surrounding road search subroutine is executed. If there is a surrounding road, the optimal route condition setting subroutine is executed (in step 156), and the number of the intersection located at the end of that road and the distance L of the road are input in step 157. Thereafter, in step 158, this distance L is added. If the result is larger than the distance from the starting point, that distance is set as the distance from the starting point, the search flag is set at 1 (indicating that the intersection is being searched), and the number of that road is input (in steps 159 and 160). Next, the step 154 is executed, and if it is determined that there is no surrounding road in step 155, the search flag is set at 2. Thereafter, the ending condition confirmation subroutine is executed, thereby completing the route search processing (in steps 161 to 163). Thus, the shortest route that is followed from the starting point to the destination is set.

Figure 21:
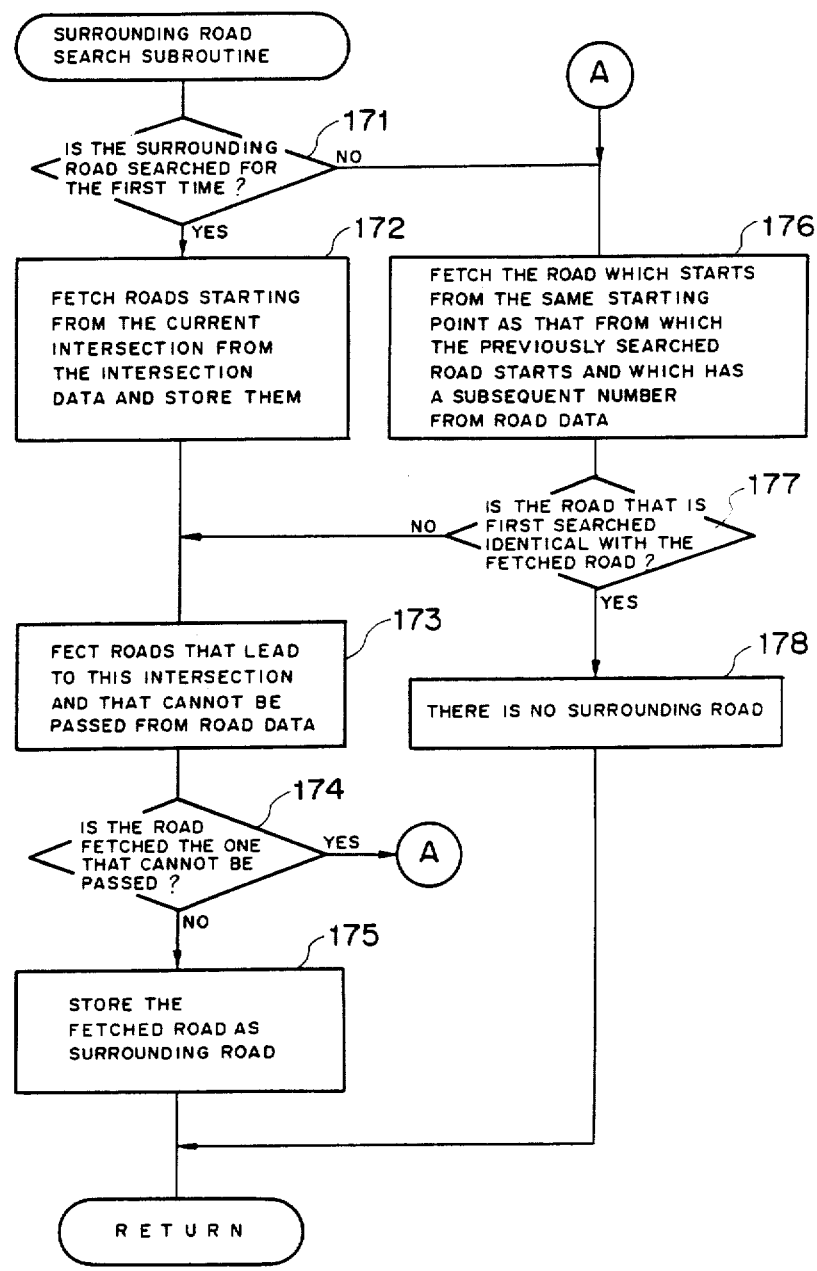

FIG. 21 is a flowchart of the surrounding road search subroutine which is executed in step 154 in the processing shown in FIG. 20. First, it is determined whether or not the search of the surrounding road is executed for the first time in step 171. If the answer is affirmative, the numbers of the roads which start from the current intersection are fetched from the intersection data and are stored in step 172. Next, in step 173, the no-passage roads that correspond to the roads that lead to this intersection are fetched from the road data, and it is then determined in step 174 whether or not the roads fetched this time are identical with the no-passage roads explained with reference to FIG. 7. If the answer is no, the fetched roads are stored as the surrounding roads. If it is determined that it is not the first time that the search of the surrounding road is executed in step 171, or if the answer of the step 174 is affirmative, the road having the same starting point as that of the previously searched road and having a subsequent number is fetched from the road data in step 176. Thereafter, in step 177, it is determined whether or not the previously searched road is identical with the road which is fetched this time. If the answer is negative, the processing proceeds to step 173. If the answer is affirmative, the processing goes to step 178 where it is determined that there is no surrounding road.

Figure 22:
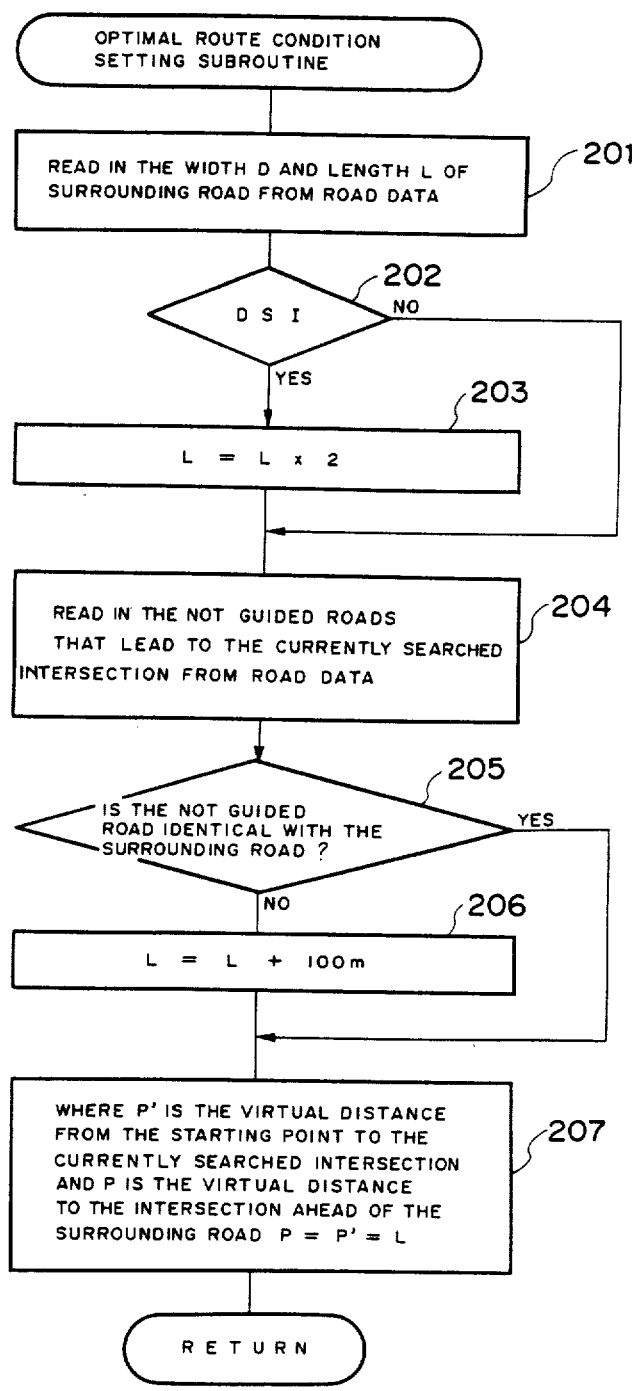

FIG. 22 is a flowchart of the optimal route condition setting subroutine executed in step 156 of the processing shown in FIG. 20. First, the width and length of the surrounding road are read in from the road data, and it is then determined whether or not the width is, for example, 1 m or less (in steps 201 and 202). If the width exceeds 1 m, the processing proceeds to step 203. If the width is 1 m or less, it is, for example, doubled in step 203, and the no guided data on the roads that lead to the currently searched intersection is read in from the road data in step 204. Thereafter, it is determined in step 205 whether or not there are surrounding roads that are identical with the no guided data. If there is such a surrounding road, the processing goes to step 207. If there is no such a surrounding road, 100 m, for example, is added to the length of the road, and the result is then added to the virtual distance of the currently searched intersection from the starting point to obtain the virtual distance of the intersection located at the end of the surrounding road in step 207.

Next, another embodiment of the present invention will be described below with reference to FIGS. 23 to 26. In the first embodiment, search is directly conducted on the CD data and IC card data, as has been described with reference to FIGS. 18 and 19. On the other hand, this embodiment prepares a comparison list of the CD data and IC card data.

FIG. 23 (a) shows the starting address of the memory where the comparison list data is stored, FIG. 23 (b) a comparison list for sub-districts which contains the order of modified data for each sub-district, and FIG. 23 (c) shows a comparison list for road data. An integer in the column of the order of modified data represents the order taken by the data when it is stored in the memory, −1 and 0 in the column indicating that the data is deleted and that the data is not changed, respectively. FIGS. 24 (a), (b) and (c) respectively show a comparison list for the intersection data, a comparison list for the landmark data, and the starting address of the modified data.

The above-described comparison list data may be created by operating data within the CPU. In that case, the CD data on all the intersections is read out and the data read out is compared with the corresponding IC data so as to determine if there is an addition or deletion of the data. The thus-created comparison list is then stored in the RAM or the like.

Figure 25:
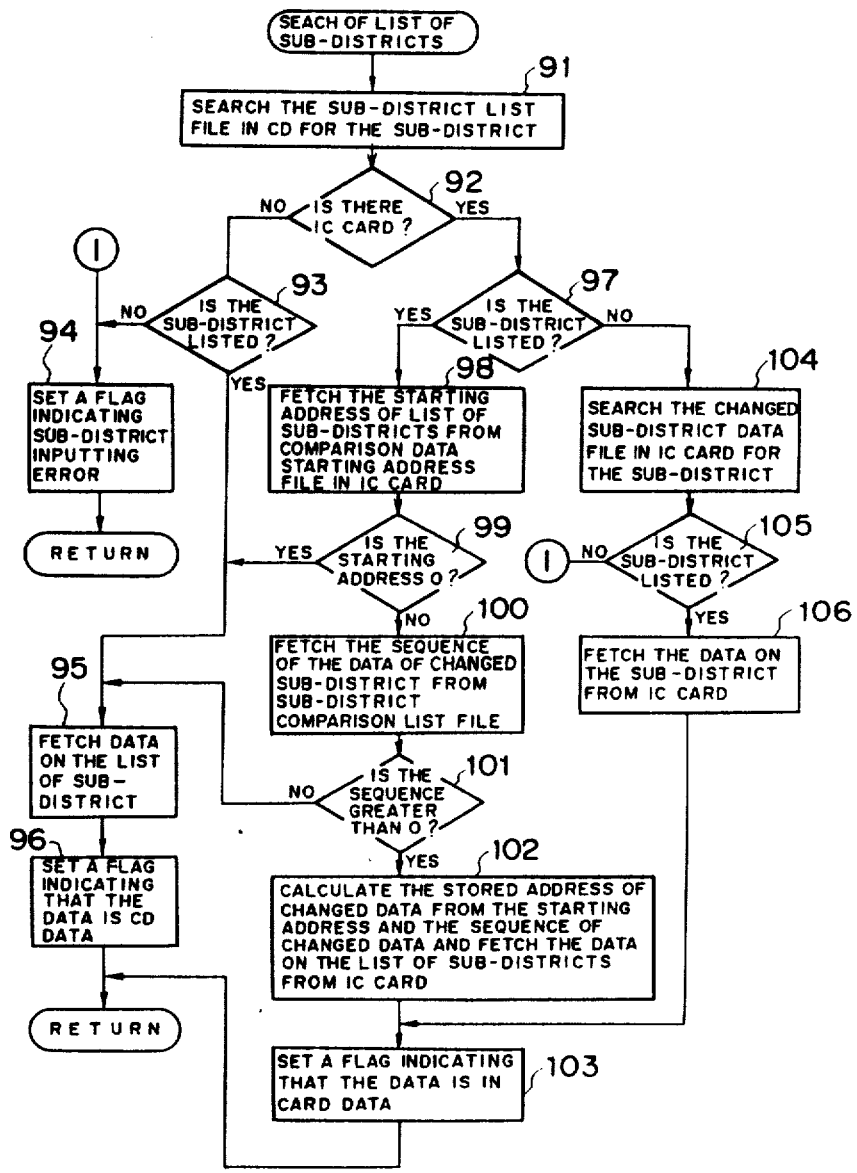
FIGS. 25 and 26 are flowcharts of a data searching process executed in the second embodiment of the present invention.
Figure 26:
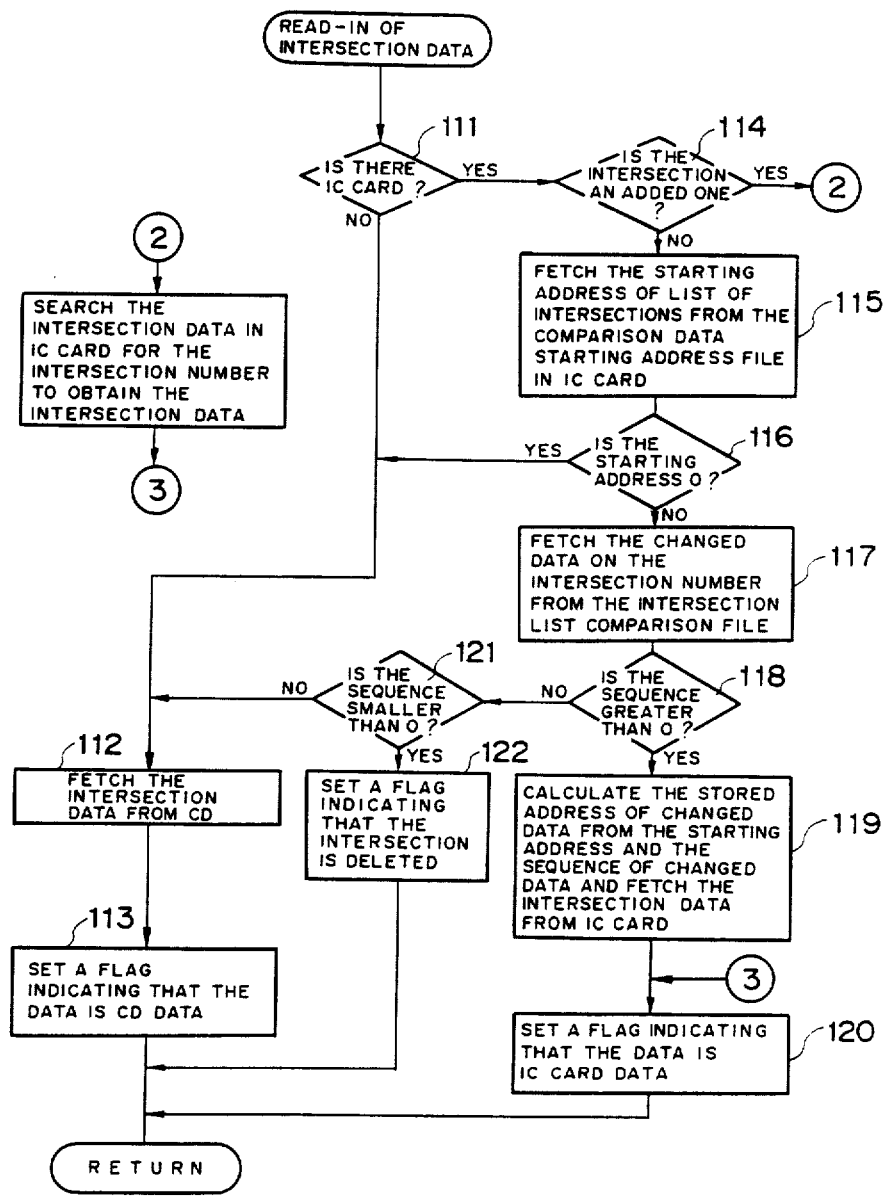

FIGS. 25 and 26 show the search processings which employ the above-described comparison lists.

In the sub-district search processing shown in FIG. 25, the sub-district is first searched in the sub-district list file in the CD in step 92, and it is then determined whether or not there is an IC card in step 92. If there is no IC card, data on the sub-district [shown in FIG. 2 (c)] is fetched from the CD, and a flag indicating that the obtained data is a CD data is set (in steps 93 to 96). If it is determined that there is an IC card in step 92, it is determined whether or not the sub-district is listed in step 97. If the sub-district is listed, the starting address of the list of sub-districts is fetched from the comparison list starting address file in the IC card [shown in FIG. 23 (a)] in step 98. Subsequently, it is determined whether or not the starting address is 0 in step 99. If the starting address is 0 (which means that there is no change), the processing goes to step 95. If the starting address is not 0, the order of the modified data on that sub-district is fetched from the comparison list for sub-districts [shown in FIG. 23 (b)] in step 100. Next, in step 101, it is determined whether or not the order is larger than 0. If the answer is no (which means that there is no change), the processing goes to step 95. If the answer is yes, the stored address of the modified data is obtained and the data on the sub-district [shown in FIG. 12 (a)] is fetched from the IC card in step 102, and a flag indicating that the data is an IC card data is set in step 103. If it is determined in step 97 that the sub-district is not listed, the sub-district modified data [shown in FIG. 12 (a)] is searched for the sub-district. If the sub-district is listed, a flag indicating that the data is an IC card data is set in step 106.

FIG. 26 is a flowchart of the read of the intersection data. First, it is determined in step 111 whether or not there is an IC card. If there is no IC card, the intersection data in the IC (shown in FIG. 5) is searched to fetch the necessary intersection data in step 112, and a flag indicating that the data is an CD data is set in step 113. If it is determined in step 111 that there is an IC card, it is determined in step 114 whether or not the intersection is an added one. If it is not an added intersection, the starting address of the list of intersections is fetched from the comparison list data starting address file [shown in FIG. 23 (a)] in the IC card in step 115. Subsequently, it is determined in step 116 whether or not the starting address is 0. If the starting address is 0 (which means that there is no change), the processing goes to step 112. If the starting address is not 0, the order of the modified data on that intersection is obtained from the intersection comparison list file [shown in FIG. 24 (a)] in step 117. Next, it is determined in step 118 whether or not the order is larger than 0. If it is not larger than 0 (which means that there is no change), the processing goes to step 112. If the order is larger than 0, the stored address of the modified data is obtained and the intersection data [shown in FIG. 12 (a)] is fetched from the IC card in step 119, and a flag indicating that the data is an IC card data is then set in step 120. In step 121, it is determined whether or not the order obtained in step 171 is a negative value. If it is, a flag indicating that the intersection is deleted is set in step 122. If it is determined that the intersection is an added one in step 114, the intersection data in the IC card (shown in FIG. 9) is searched to fetch the intersection data in step 123, and the processing then proceeds to step 120.

Still another embodiment of the present invention will be described below with reference to FIGS. 27 to 30. Whereas the modified data stored in an IC card is searched directly or by using a comparison list in the above-described embodiments, the present embodiment involves designation of a region where the modified data exists.

FIG. 27 (a) shows a method of designating a modified region using the most northerly latitude, the most southerly latitude, the most easterly longitude, and the most westerly longitude, FIG. 27 (b) shows a method of designating the modified region using a polygon defined by latitude and longitude, FIG. 27 (c) shows a method of designating a modified region using a polygon defined by roads, and FIG. 27 (d) shows a method of designating a modified region using the intersections or landmarks.

Figure 28:
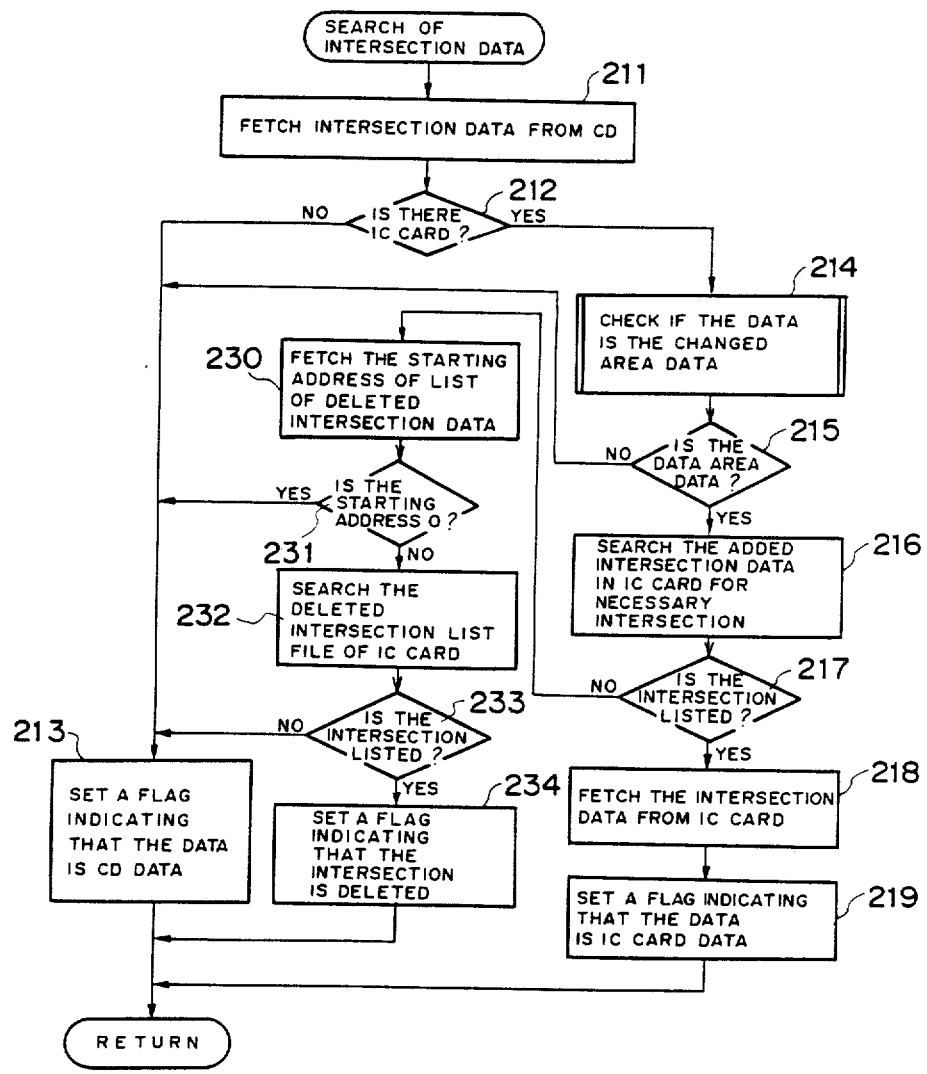
FIGS. 28, 29 and 30 (a) are flowcharts of a data searching process executed in the third embodiment of the present invention.

FIG. 28 is a flowchart of processing of search of intersection data which is employed by this region designation method. In step 211, the intersection data (shown in FIG. 5) is fetched from the CD, and it is then determined in step 212 whether or not there is an IC card. If there is no IC card, a flag indicating that the data is a CD data is set in step 213. If there is an IC card in step 212, it is determined whether or not the intersection is within the modified region designated by any of the methods shown in FIG. 27. If the intersection is outside of the modified region, the processing proceeds to step 213. If it is within the region, the added intersection data (shown in FIG. 9) stored in the IC card is searched for a necessary intersection (in step 216). If it is determined in step 217 that the intersection is listed, the intersection data is fetched from the IC card in step 218, and a flag indicating that the data is an IC card data is then set in step 219. If it is determined in step 217 that the necessary intersection is not included in the added intersection data in the IC card, the starting address of the intersection data is fetched from the deletion list data starting address [shown in FIG. 13 (d)] in step 230. Thereafter, it is determined in step 231 whether or not the starting address is 0. If it is not 0, the deleted intersection list file [shown in FIG. 13 (b)] in the IC card is searched. If the intersection is contained in the file, a flag indicating that the intersection is deleted is set (in steps 233 and 234).

Figure 29:
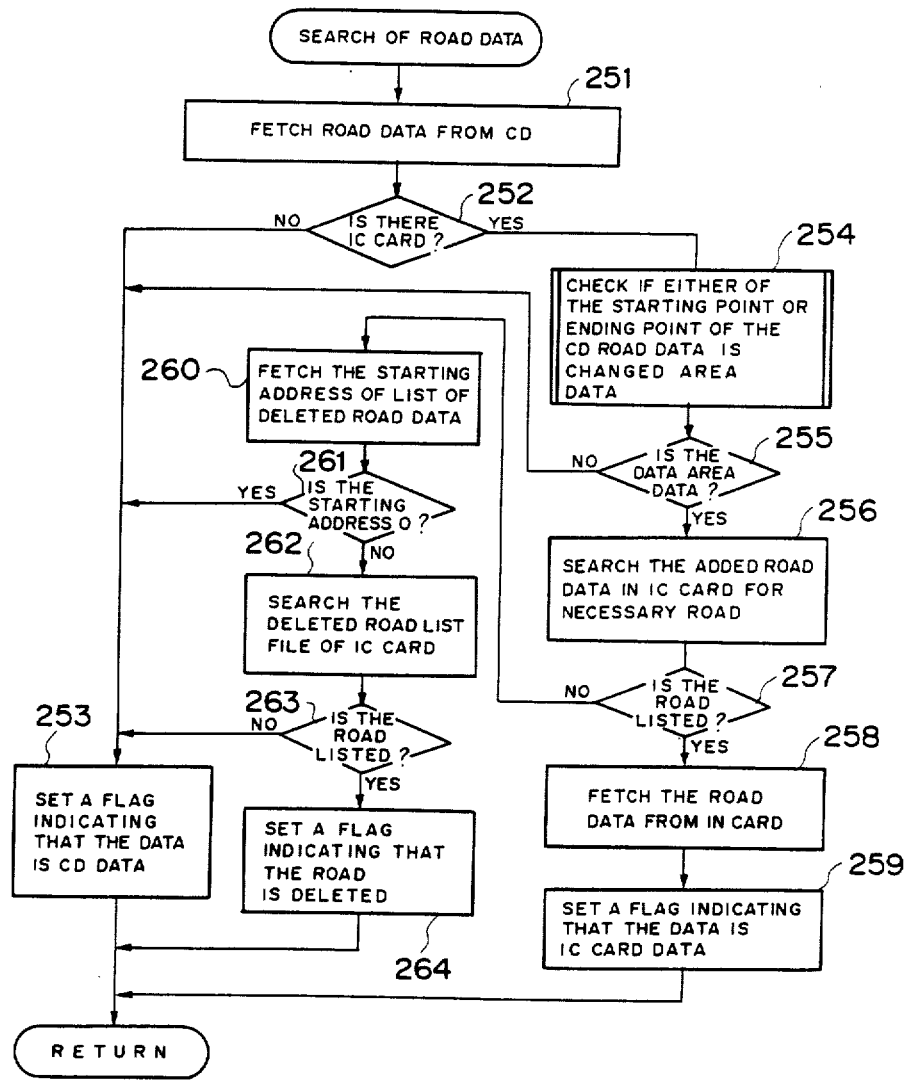

FIG. 29 is a flowchart of road data search processing employed in the region designation method. The contents of the processing are the same as those shown in FIG. 28, description thereof being omitted.

Figure 30:
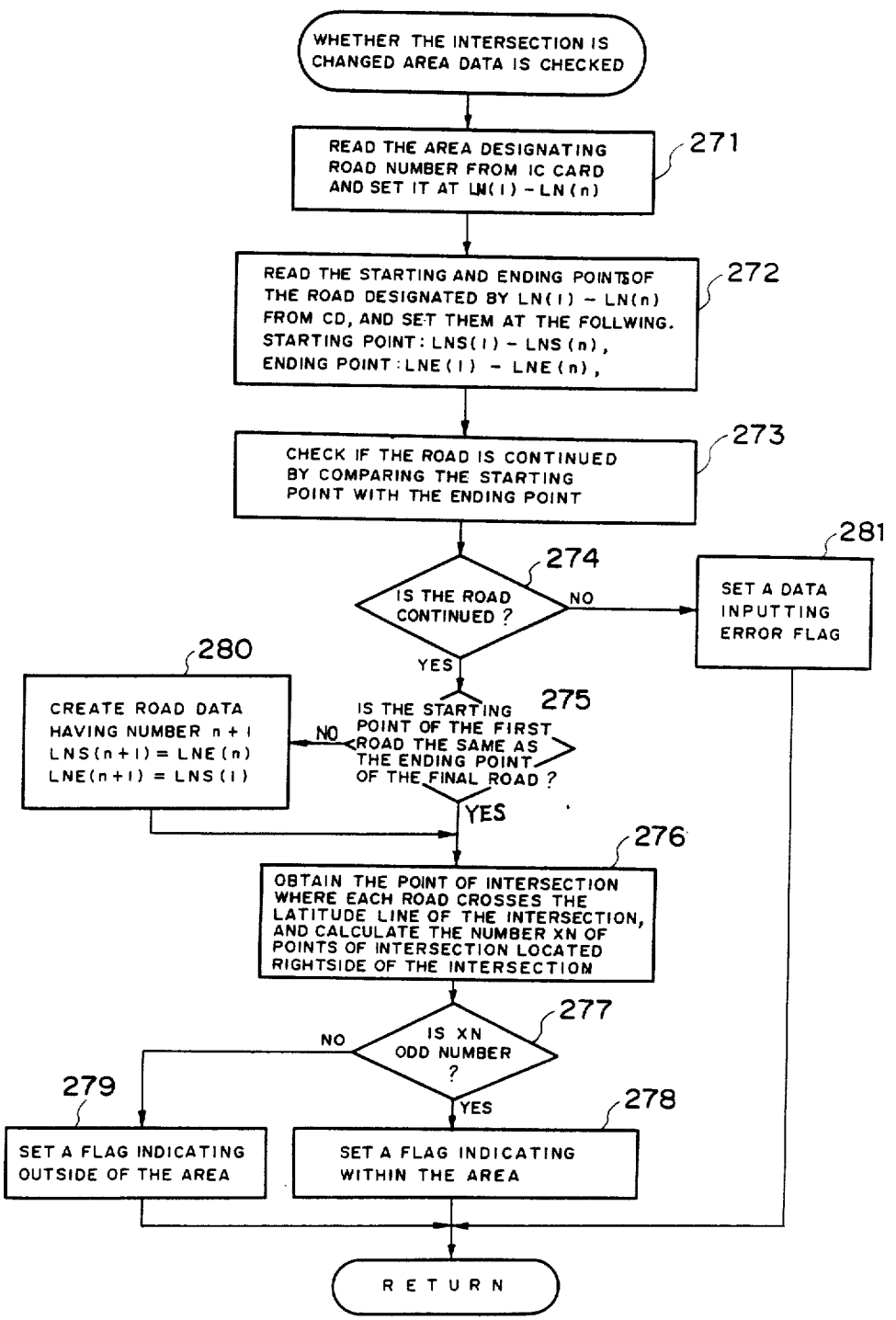
Figure 30B:
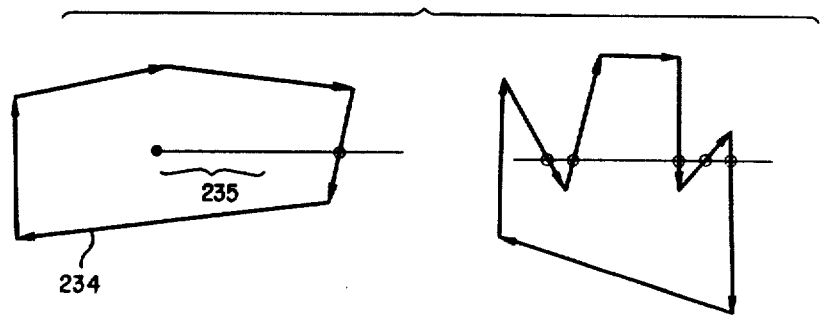
FIGS. 30(b) and 30(c) explain a method of judging whether a data is within an area or outside of the area.

FIG. 30 (a) is a flowchart of processing of determining whether or not the data is within a region which is executed when the region is designated using the roads shown in FIG. 27 (c).

Figure 30C:
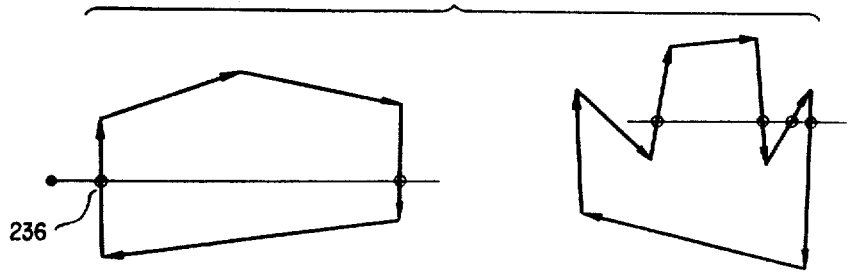

First, the road numbers required to designate a region are read from the IC card, and the data read is assigned to LN(1) . . . LN(n) in step 271. Next, the starting points and ending points of the roads designated by LN(1) ... LN(n) are read from the CD, and the data read which represent the starting points is assigned to LNS(1) ... LNS (n) while the data representing the ending points is assigned to LNE (1) ... LNE (n) (in step 272). Subsequently, the stating points and ending points are compared with each other so as to check whether or not the roads are connected (in steps 273 and 274). If the roads are not connected, a data inputting error flag is set (in step 281). If the roads are connected, it is determined in step 275 whether or not the starting point of the first road is identical with the ending point of the last road, i.e., whether or not the intersection is surrounded by the roads. If it is not surrounded by the roads, a (n+1) the road is virtually created so that the intersection can be surrounded by the roads in step 280. Thereafter, in step 276, a point of intersection where each road crosses the latitude line that passes the intersection is calculated, and the number XN of points of intersection located on the right side of the intersection is then counted. Next, it is determined in step 277 whether or not this XN is an odd number, and a flag indicating that the intersection is within the region or outside the region is accordingly set (in step 278 or 279). FIG. 30 (b) shows examples in which the intersection is within the region and FIG. 30 (c) shows examples outside the region. FIG. 30 (b) includes roads (234) and the intersection and latitude line that passes the intersection (235). FIG 30(c) includes a point of intersection (236).

As in the case of the method which utilizes a comparison list and which is described with reference to FIGS. 25 and 26, a comparison list may be made beforehand by checking if each of the intersections is located outside the region or if it is a modified data, and the resultant comparison list may be stored in the RAM or the like.

Still another embodiment of the present invention will be described below with reference to FIGS. 31 to 35. Whereas each of the above-described embodiments involves storage of modified names of places, intersections and roads in an IC card, modified geographical feature data is stored in an IC card in this embodiment.

FIG. 31 shows the structure of geographical feature data stored in a CD. The geographical data includes the most northerly latitude, the most southerly latitude, the most easterly longitude, the most westerly longitude, adjacent screens G1 to G8, screen data $a_{11} \ldots a_{mn}$, and a plurality of large- and small-scale maps. The screen data represents lands, sea, rivers and so on displayed on the screen in different colors using the bit mapping technique.

FIG. 32 shows added geographical feature data stored in an IC card, which includes the comparison list data starting address shown in FIG. 32 (a), the geographical data comparison list shown in FIG. 32 (b), the modified data starting address shown in FIG. 32 (c), and the added geographical data shown in FIG. 32 (d). The IC card may also store the map of a parking lot or the like which cannot be stored in the CD. This allows for the reduction in the number of data stored in the CD.

Figure 33:
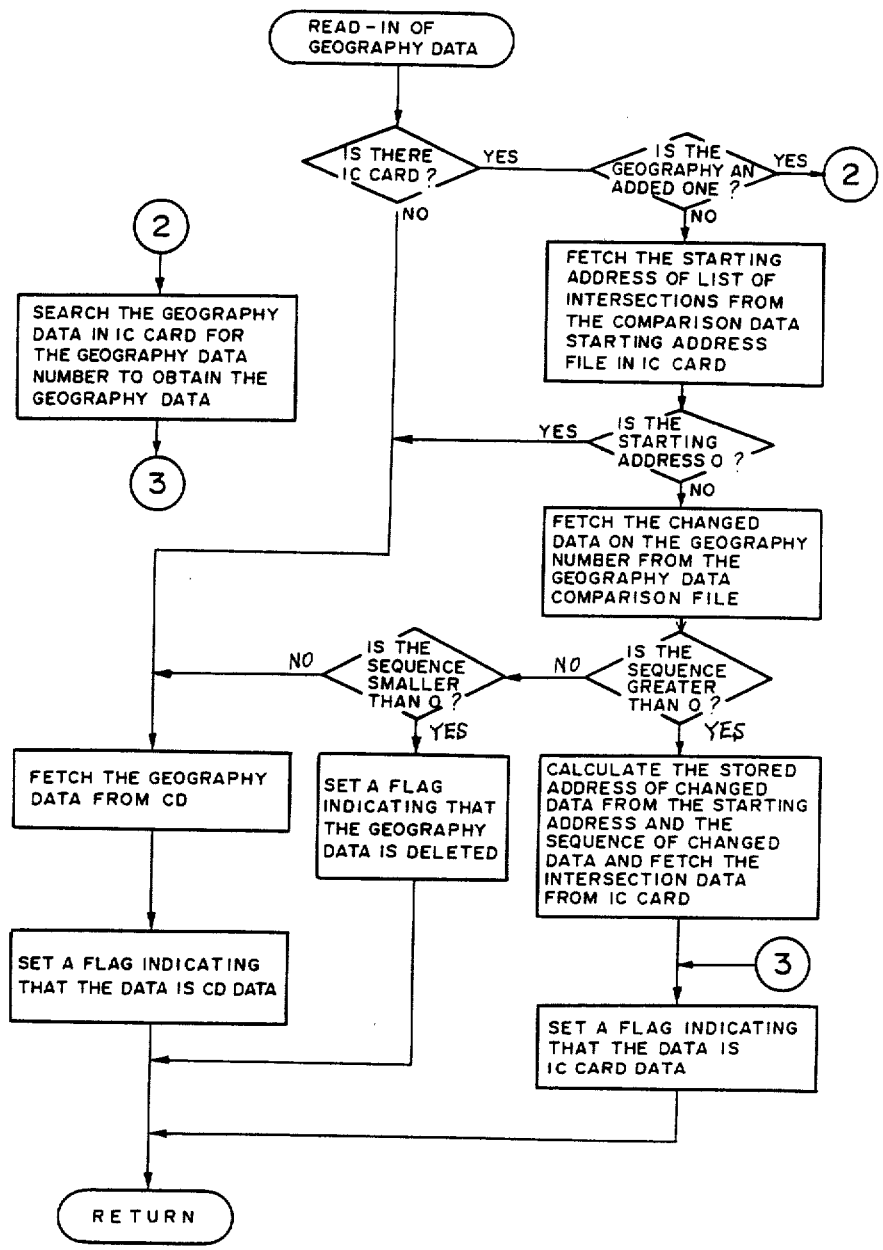
FIGS. 33, 34 and 35 are flowcharts of a data searching process executed in the fourth embodiment of the present invention.

FIG. 33 is a flowchart of processing of read of the geographical feature data. The contents of the processing are the same as those shown in FIG. 26, description thereof being omitted.

Figure 34:
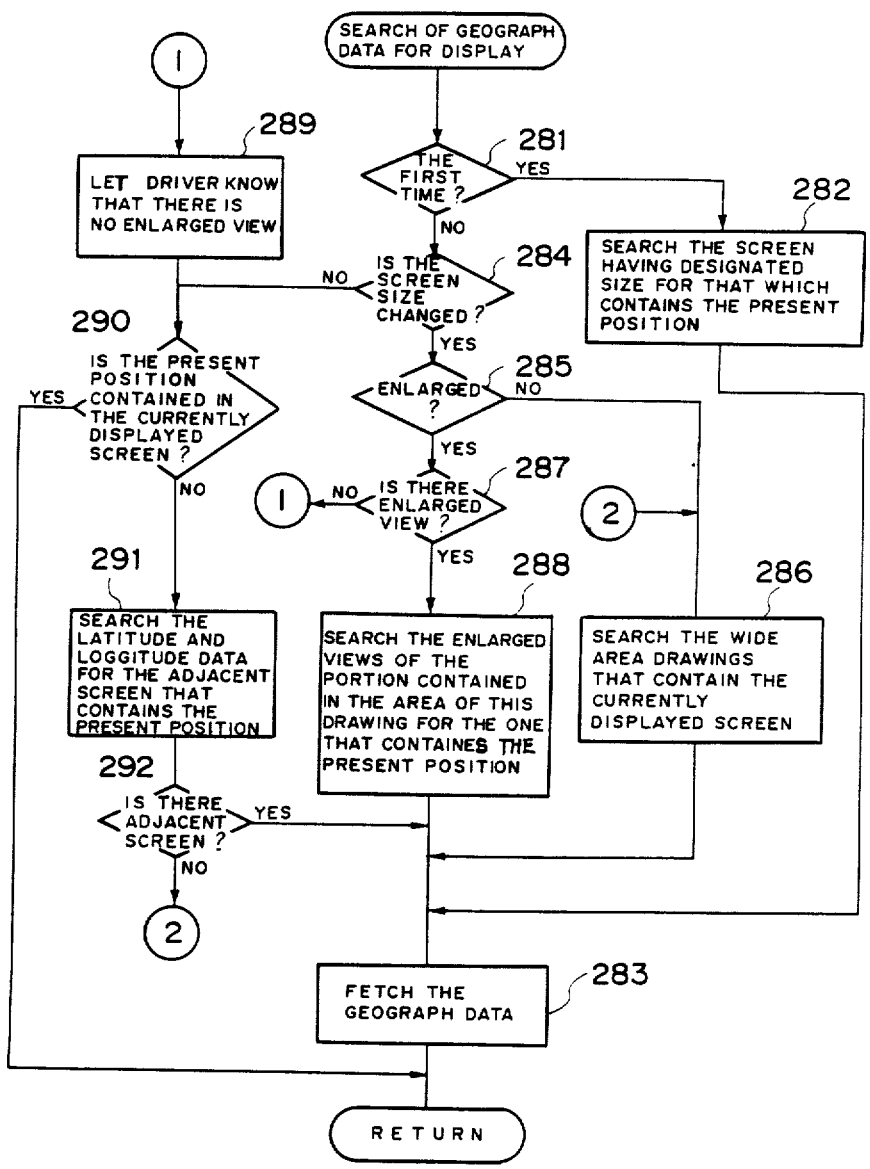

FIG. 34 is a flowchart of processing of search of the geographical feature data to be displayed. First, it is determined in step 281 whether or not it is the first time that the search is conducted. If it is, the geographical feature data which has a designated screen size and which contains the present position is searched (in steps 282 and 283). If it is determined that it is not the first time in step 281, it is determined in step 284 whether or not the screen size is to be changed. If the screen size is to be changed, it is determined in step 285 whether or not the screen is enlarged in step 285. If it is determined that the screen is scaled down, small-scale map data of a large area which contains the currently displayed screen is searched in step 286. If it is determined in step 285 that the screen is enlarged, it is determined in step 287 whether or not there are enlarged maps. If there are enlarged maps, the enlarged map of the portion in the area which contains the present position is searched in step 288. If there are no enlarged maps, the fact that there is no enlarged maps is informed to the driver in step 289. If the answer is negative in step 284, the processing goes to step 290 where it is determined whether or not the currently displayed screen contains the present position. If it does not, search is conducted on the latitude/longitude data for the adjacent screen which contains the present position in step 291. Thereafter, it is determined in step 292 whether or not there is the adjacent screen which contains the present position. If there is, the processing goes to step 283. If there is no such adjacent screen, the processing goes to step 286 where the small-scale map data is searched.

Figure 35:
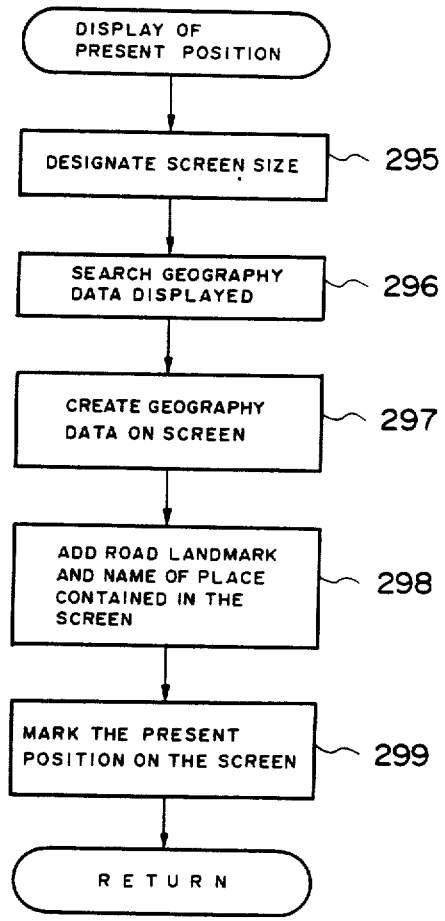

FIG. 35 is a flowchart of the processing of modification of the geographical feature data. This enables the roads, landmarks and names of places to be added on the screen and enables the present position on the display to be marked.

In the above-described embodiments, the present invention is applied to the coordinate origin method. It is to be noted, however, if the contents of the data are selected, the present invention can be applied to the fixed route method or the location method.

FIG. 36 is a flowchart of the navigation control conducted in the fixed route method. Once a user has input the present location and a destination, route search is executed (in steps 301 to 303). Once the route has been fixed, the present position and the route are displayed (in steps 304 and 305). Subsequently, the sensor signal which represents the vehicle position is input, and the present position is then calculated (in steps 306 and 307). The processing from steps 303 to 307 is repeated in step 308 to guide the vehicle to the destination.

FIG. 37 is a flowchart of the navigation control conducted in the location method. In this method, route search is not executed, and the map and the vehicle position are displayed on a screen. In consequence, only the geographical feature data is stored in a CD and an IC card.

What is claimed is:

1. A navigation system for a vehicle comprising:
   a first external storage means for storing first guidance data including road and intersection data;
   a second external storage means for storing second guidance data; and second guidance data being linked to said first guidance data and including more detailed road and intersection data associated with a smaller geographic area when compared to said first guidance data;
   output means for outputting guidance information; and
   CPU means for receiving said first and second guidance data from said first and second external storage means, supplementing said first guidance data by said second guidance data, and outputting said guidance information based on said supplemented guidance data via said output means.

2. A navigation system according to claim 1, wherein said second external storage device comprises one of a floppy disk, an optical disk, a magnetic tape, an IC card and an optical card.

3. A navigation system according to claim 1, wherein said CPU means prepares a comparison data list from said first and second guidance data stored in each of said first and second external storage means, and selectively operates said first and second guidance data stored in said first and second external storage means based on said comparison data list.

4. A navigation system according to claim 1, wherein said second guidance data includes a comparison data list of said first and second guidance data, and said CPU means selectively operates said first and second guidance data stored in said first and second external storage means based upon said comparison data list.

5. A navigation system according to claim 1, wherein said second guidance data includes a table for coordinating said first and second guidance data, and said CPU means selectively operates said first and second guidance data stored in said first and second external storage device based upon said table.

6. A navigation system according to claim 1, wherein said first guidance data corresponds to a larger geographical area and said second guidance data corresponds to said smaller geographical area contained within said larger geographical area.

7. A navigation system according to claim 1 including receiving means for inputting said second guidance data from an external source.

8. A navigation system according to claim 7, wherein said receiving means includes a modem.

9. A navigation system according to claim 1, wherein said second external storage means includes removable media and said second guidance data can be replaced by new second guidance data by replacing said removable media with a new removable media containing said new second guidance data.

10. A navigation system for a vehicle comprising:
present position means for determining a present position of said vehicle;
first external storage means for storing first guidance data including road and intersection data;
a second external storage means for storing second guidance data; said second guidance data being linked to said first guidance data and including more detailed road and intersection data association with a smaller geographic area when compared to said first guidance data;
output means for outputting guidance information; and
CPU means for receiving said first and second guidance data from said first and second external storage means, supplementing said first guidance data by said second guidance data, and outputting said guidance information together with said present position via said output means based on said supplemented guidance data.

11. A navigation system according to claim 10 wherein said present position means comprises a GPS receiver.

12. A navigation system according to claim 10 wherein said present position means comprises a beacon receiver.

13. A navigation system according to claim 10 wherein said present position means comprises a geomagnetic sensor and a distance sensor.

14. A navigation system according to claim 10 wherein said present position means comprises a distance sensor and a steering sensor.

15. A navigation system for a vehicle comprising:
input means for inputting a starting point and destination;
a present position means for determining a present position of said vehicle;
a first external storage means for storing first guidance data including road and intersection data;
a second external storage means for storing second guidance data; said second guidance data being linked to said first guidance data and including more detailed road and intersection data associated with a smaller geographic area when compared to said guidance data;
output means for outputting guidance information, including a display means for displaying visual information; and
CPU means for receiving said first and second guidance data from said first and second external storage means, setting a guide route based on said starting point and said destination including supplementing said first guidance data by said second guidance data, and outputting said guide route as said guidance information together with said present position data via said output means.

16. A navigation system for a vehicle comprising:
input means for inputting a starting point and destination;
a first external storage means for storing first guidance data including road and intersection data;
a second external storage means for storing second guidance data; said second guidance data being linked to said first guidance data and including more detailed road and intersection data association with a smaller geographic area when compared to said first guidance data;
output means for outputting guidance information; and
CPU means for receiving said first and second guidance data from said first and second external storage means, setting coordinates of a plurality of points from said starting point to said destination including supplementing said first guidance data by said second guidance data, and outputting said guidance information based on said set coordinates via said output means at each of said points up to said destination.

17. A navigation system for a vehicle comprising:
an external storage means for storing guidance data including road and intersection data;
an internal storage means for storing second guidance data; said second guidance data being linked to said first guidance data and including more detailed road and intersection data associated with a smaller geographic area when compared to said first guidance data;
output means for outputting guidance information; and
CPU means for receiving said first and second guidance data from said external and internal storage means, supplementing said first guidance data by said second guidance data, and outputting said guidance information based on said supplemented guidance data via said output means.

* * * * *